(12) United States Patent
Kitagawa

(10) Patent No.: US 8,278,853 B2
(45) Date of Patent: Oct. 2, 2012

(54) BRUSHLESS MOTOR CONTROL APPARATUS, BRUSHLESS MOTOR AND CONTROL METHOD OF BRUSHLESS MOTOR

(75) Inventor: Takayuki Kitagawa, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 369 days.

(21) Appl. No.: 12/662,408

(22) Filed: Apr. 15, 2010

(65) Prior Publication Data

US 2010/0264862 A1 Oct. 21, 2010

(30) Foreign Application Priority Data

Apr. 16, 2009 (JP) ................................. 2009-100235

(51) Int. Cl.
*H01L 41/08* (2006.01)

(52) U.S. Cl. ................................................. 318/400.13

(58) Field of Classification Search .............. 318/400.13, 318/400.1, 400.2, 400.26
See application file for complete search history.

(56) References Cited

U.S. PATENT DOCUMENTS

| | | | | |
|---|---|---|---|---|
| 7,589,486 B2 * | 9/2009 | Yamada et al. | ............... | 318/432 |
| 7,650,760 B2 * | 1/2010 | Nakata et al. | ................. | 62/228.1 |
| 2005/0168187 A1 * | 8/2005 | Uchiyama et al. | ............ | 318/772 |
| 2006/0113949 A1 * | 6/2006 | Nishimura et al. | ........... | 318/723 |
| 2006/0179859 A1 * | 8/2006 | Nakata et al. | ................. | 62/228.1 |

FOREIGN PATENT DOCUMENTS

| | | |
|---|---|---|
| JP | U-H03-91092 | 9/1991 |
| JP | A-H09-47066 | 2/1997 |
| JP | A-2003-47277 | 2/2003 |

* cited by examiner

*Primary Examiner* — Mark Budd
(74) *Attorney, Agent, or Firm* — Posz Law Group, PLC

(57) ABSTRACT

A power supply control device turns off energization of coils from a power supply device when a rotational speed of a motor reaches 500 rpm. After elapsing of one electrical cycle from the time of starting the turning off of the energization, a comparator of a correction device outputs a comparator signal, which is obtained by comparing a voltage of a neutral point of the coils and an induced voltage of the coil. An EX-OR circuit outputs an EX-OR signal, which is an exclusive OR value of the comparator signal and an output signal of a Hall sensor. A sensing unit obtains an electrical angle of a period, during which the EX-OR signal is in a H-level. A difference between the obtained electrical angle and a standard electrical angle of 30 degrees is stored as a correction data value. Thereafter, energization of the coils is restarted.

8 Claims, 16 Drawing Sheets

FIG. 12A

- OUTPUT SIGNAL U
- COMPARATOR SIGNAL C
- EX-OR SIGNAL

REFERENCE ELECTRICAL ANGLE

FIG. 12B

- OUTPUT SIGNAL U
- COMPARATOR SIGNAL C
- EX-OR SIGNAL

- OUTPUT SIGNAL U
- COMPARATOR SIGNAL C
- EX-OR SIGNAL

X3

ONE ELECTRICAL CYCLE  UNIT: DEGREES
0  30  60  120  180  210  240  300  360

ROTATIONAL DIRECTION

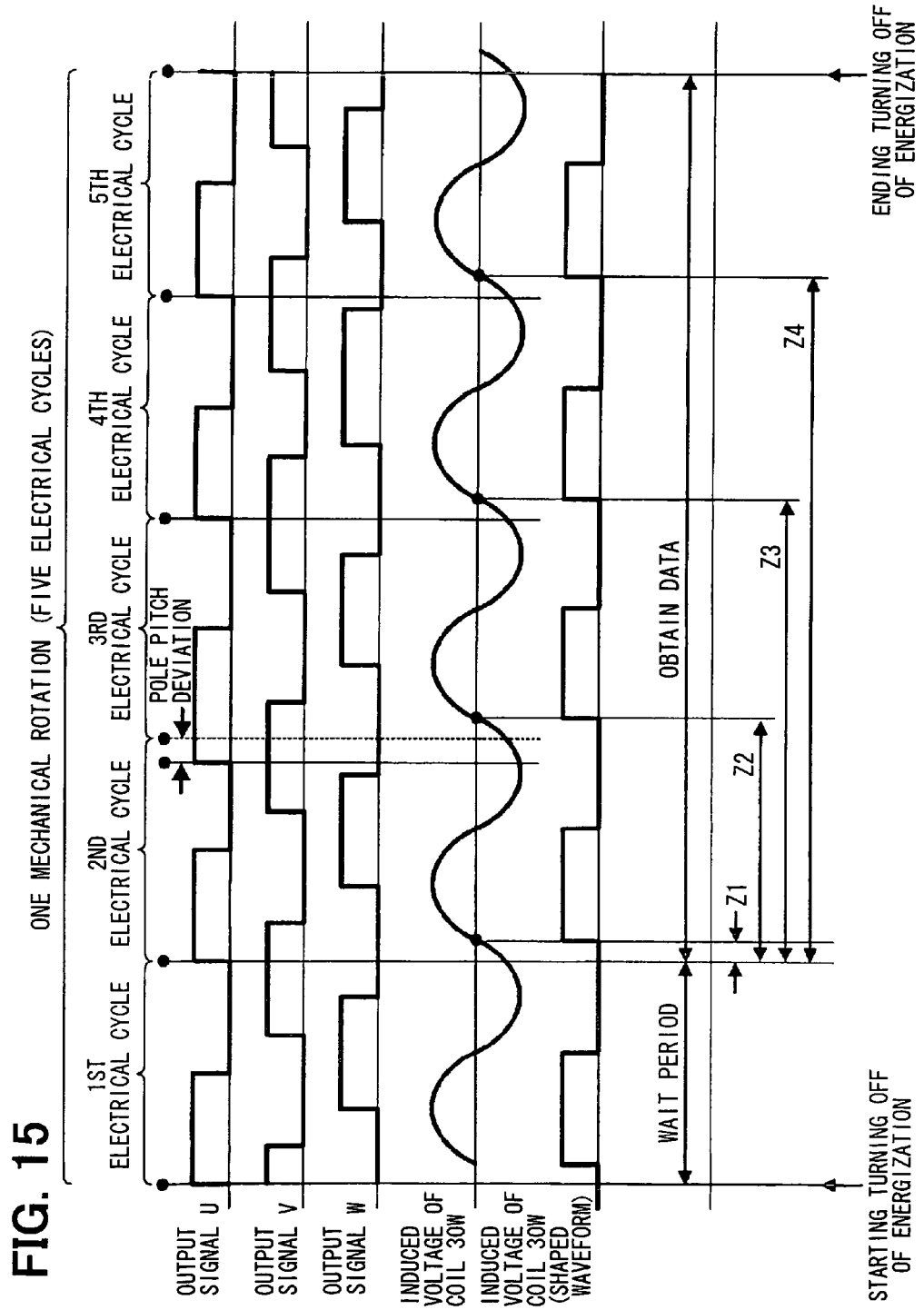

BRUSHLESS MOTOR CONTROL APPARATUS, BRUSHLESS MOTOR AND CONTROL METHOD OF BRUSHLESS MOTOR

CROSS REFERENCE TO RELATED APPLICATION

This application is based on and incorporates herein by reference Japanese Patent Application No. 2009-100235 filed on Apr. 16, 2009.

BACKGROUND OF THE INVENTION

1. Field of the Invention

The present invention relates to a brushless motor control apparatus, a brushless motor and a control method of the brushless motor.

2. Description of Related Art

Some blower motors are formed as a multi-phase brushless motor. In this brushless motor, a rotational position of a rotor is sensed with Hall sensors (a position sensing means), and coils of multiple phases are energized based on measurement signals of the Hall sensors, which indicate the sensed rotational position of the rotor.

In the brushless motor of the above type, a mechanical positional deviation of any one of the Hall sensors from its proper position may cause a deviation in the energization timing for energizing the corresponding one of the coils of the multiple phases from its appropriate timing, thereby resulting in generation of a noisy sound or a vibration of the motor.

In view of the above disadvantage, for instance, Japanese Unexamined Patent Publication No. 2003-47277A provides a technique of correcting the positional deviation of the Hall sensor for implementing the appropriate energization timing. However, in this technique, a relative positional deviation between the Hall sensor and the rotor magnet is not corrected. In a case where a positional accuracy of the Hall sensor is finely set to avoid the relative positional deviation between the Hall sensor and the rotor magnet, the costs in the manufacturing process are substantially disadvantageously increased. Furthermore, in order to correct the relative positional deviation between the Hall sensor and the rotor magnet, the amount of deviation in the position of the Hall sensor from its appropriate position is stored as a correction data, value in an external storage device (e.g., EEPROM) in an inspection process after installation of the Hall sensor to the motor. Then, the energization of the coils is performed based on the correction data value. In such a case, the external storage device (e.g., the EEPROM) is disadvantageously expensive, and the external storage device (e.g., the EEPROM) has a disadvantageously low heat resistance. Therefore, the above technique is not suitable for the brushless motor, the temperature of which becomes disadvantageously high.

In view of the above disadvantages, for instance, Japanese Unexamined Patent Publication No. H09-47066A provides a technique of correcting the relative positional deviation between the Hall sensor and the rotor magnet based on a value of correction data (hereinafter, referred to as a correction data value) that is created with reference to an output signal of the Hall sensor and a zero-cross point of an induced voltage, which is generated in a state where the energization of the coils of all the phases are turned off.

In a case where the correction is made based on the correction data value, which is obtained in one time, when a noise is generated at the time of obtaining the correction data value, the correction is made based on the correction data value, which includes the noise. Thereby, in such a case, the appropriate correction may not be possible. There is proposed a technique of correcting the deviation based on an average value of the correction data values, which are generated by obtaining the correction data value multiple times to improve the reliability of the correction data value and thereby to accurately correct the positional deviation. In such a case, the correction data value is obtained multiple times, so that the time period of turning off of the energization of the coils is lengthened.

Furthermore, in the case of Japanese Unexamined Patent Publication No. H09-47066A where the energization of, the coils of all the phases is turned off in the brushless motor at the time of obtaining the correction data value, the brushless motor may possibly be stalled (i.e., decelerated and stopped) at the time of sensing the zero-cross point of the induced voltage. When the time period of turning off of the coils of all the phases is lengthened, the deceleration of the rotational speed of the motor is increased, and the rotation is unsmoothed. Thereby, a noisy sound may possibly be generated.

SUMMARY OF THE INVENTION

The present invention addresses the above disadvantages. According to the present invention, there is provided a brushless motor control apparatus including a power supply means, a rotational position sensing means, a power supply control means, a correction means and a correction control means. The power supply means is for energizing each of a plurality of windings of a plurality of phases in a brushless motor at corresponding predetermined energization timing. The rotational position sensing means is for sensing a rotational position of a rotor of the brushless motor and for outputting a rotational position measurement signal, which corresponds to the sensed rotational position of the rotor. The power supply control means is for controlling the energization timing of the power supply means based on the sensed rotational position of the rotor. The correction means is for obtaining an electrical angle of a period between timing, at which an induced voltage generated in the brushless motor becomes a predetermined value after turning off of the energization of the plurality of windings from the power supply means, and timing, at which an output level of the rotational position measurement signal is changed. The correction means is also for correcting the sensed rotational position of the rotor, which is sensed by the rotational position sensing means, with reference to the obtained electrical angle. The correction control means is for controlling the correction means such that the correction means obtains the electrical angle of the period between the timing, at which the induced voltage becomes the predetermined value, and the timing, at which the output level of the rotational position measurement signal is changed, in a period of one complete rotation of the rotor after elapsing of one electrical cycle from the time of turning off of the energization of the plurality of windings from the power supply means.

According to the present invention, there is also provided a brushless motor including the brushless motor control apparatus.

According to the present invention, there is also provided a control method of the brushless motor. According to the method, each of a plurality of windings of a plurality of phases is energized by a power supply means in the brushless motor at corresponding predetermined energization timing. A rotational position of a rotor of the brushless motor is sensed by a rotational position sensing means. A rotational position measurement signal, which corresponds to the sensed rotational position of the rotor, is outputted from the rotational position sensing means. The energization timing of the power supply means is controlled by a power supply control means based on the sensed rotational position of the rotor. An electrical angle of a period between timing, at which an induced voltage generated in the brushless motor becomes a predetermined value after turning off of the energization of the plurality of windings from the power supply means, and timing, at which an output level of the rotational position measurement signal is changed, is obtained by a correction means. The sensed rotational position of the rotor, which is sensed by the rotational position sensing means, is corrected by the correction means with reference to the obtained electrical angle. The correction means is controlled by a correction control means such that the correction means obtains the electrical angle of the period between the timing, at which the induced voltage becomes the predetermined value, and the timing, at which the output level of the rotational position measurement signal is changed, in a period of one rotation of the rotor after elapsing of one electrical cycle from the time of turning off of the energization of the plurality of windings from the power supply means.

BRIEF DESCRIPTION OF THE DRAWINGS

The invention, together with additional objectives, features and advantages thereof, will be best understood from the following description, the appended claims and the accompanying drawings in which:

FIG. 12A is a time chart showing a relationship of an output signal U, a comparator signal C and an EX-OR signal for sensing a positional deviation of the Hall sensor in a normal case where no positional deviation of the Hall sensor exists according to the first embodiment;

FIG. 12B is a time chart showing the relationship of the output signal U, the comparator signal C and the EX-OR signal in a case where a delay exists according to the first embodiment;

FIG. 12C is a time chart showing the relationship of the output signal U, the comparator signal C and the EX-OR signal in a case where an advancement exists 20 according to the first embodiment;

FIG. 15 is a time chart showing an operation of a correction device of the third embodiment.

DETAILED DESCRIPTION OF THE INVENTION (First Embodiment)

A first embodiment of the present invention will be described with reference to the accompanying drawings. In the present embodiment, a brushless motor and a brushless motor control apparatus are applied to a motor actuator of an air conditioning system of a vehicle (hereinafter, referred to as a vehicle air conditioning system).

Figure 1:
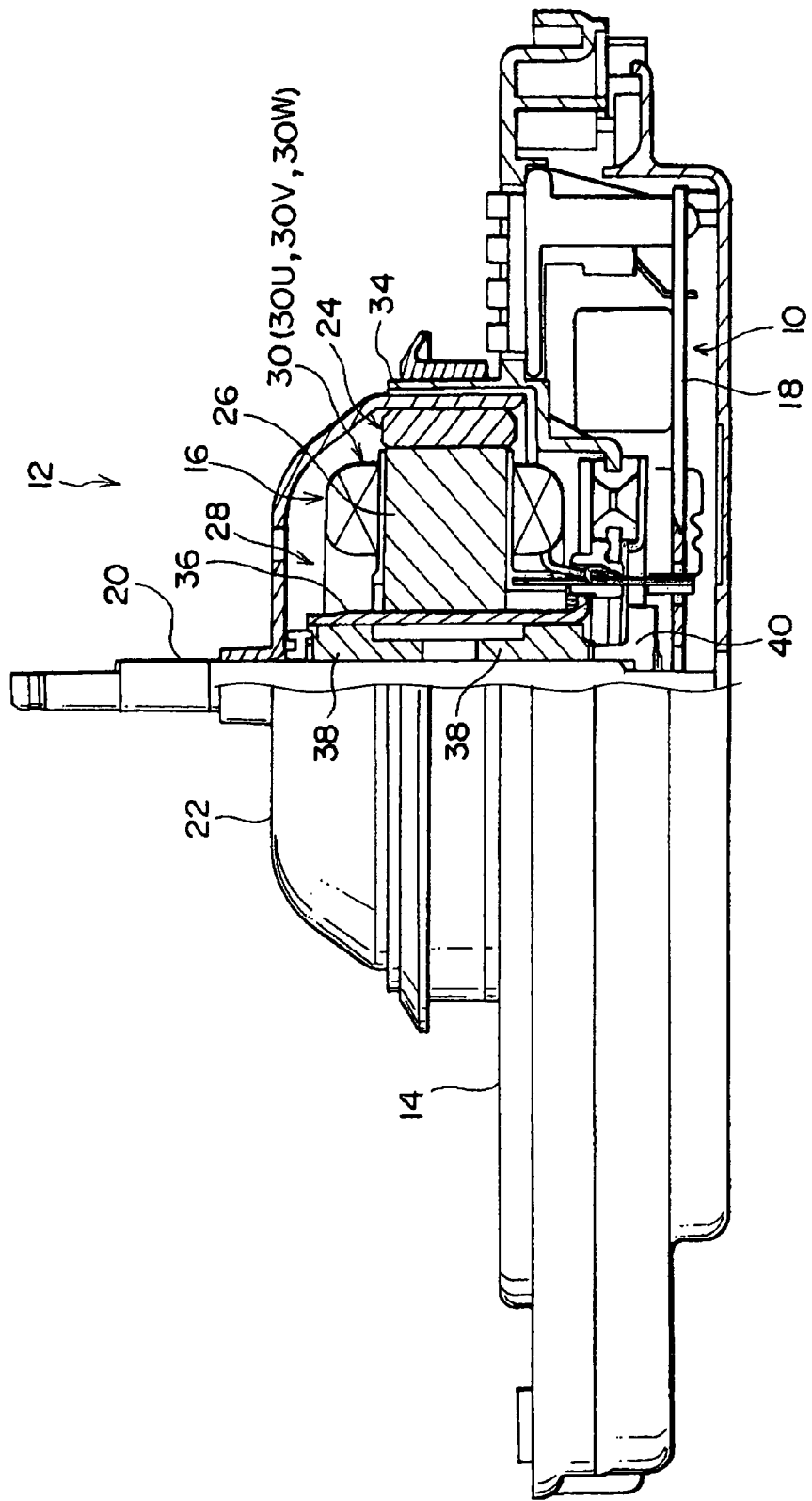
FIG. 1 is a partially fractured front view of a motor actuator according to a first embodiment of the present invention.

A structure of the motor actuator for the vehicle air condition system will be schematically described. FIG. 1 is a partially fractured front view of the motor actuator of the present embodiment.

As shown in FIG. 1, the motor actuator 12 of the present embodiment includes a housing 14, which receives a brushless motor 16 (hereinafter, also simply referred to as a motor 16) and a control circuit board 18 of a brushless motor control apparatus 10 (hereinafter, referred to as a motor control apparatus 10).

As shown in FIG. 1, the housing 14 is configured into a shallow box shape having an opening at one end part thereof. A generally cylindrical tubular portion 34 is integrally formed at the opening end part of the housing 14.

A support portion 36, which is configured into a generally cylindrical tubular form, is provided to the housing 14. A stator 28 is integrally installed to an outer peripheral part of the support portion 36. The stator 28 has a core 26, which is a laminated core that includes a plurality of thin steel plates stacked one after another. Coils (a group of coils, i.e., a group of windings) 30, which include coils 30U, 30V, 30W of three phases, are wound around the core 26. When it is not necessary to distinguish the respective coils 30U, 30V, 30W, these coils 30U, 30V, 30W will be collectively referred to as the coils 30. On the other hand, when it is necessary to distinguish the respective coils 30, the alphabet "U", "V" or "W" will be added to the numeral 30. The coils 30 are phase shifted by the electrical angle of 120 degrees from each other. When the coils 30 are alternately energized at the predetermined cycles (predetermined intervals), a predetermined rotational magnetic field is formed around the stator 28.

Two bearings 38 are fixed to an inner peripheral surface of the support portion 36 to support a shaft 20 in such a manner that the shaft 20 is coaxial with the support portion 36 and the tubular portion 34 and is rotatable about a rotational axis thereof.

One axial end part of the shaft 20 axially protrudes from the tubular portion 34. An undepicted blower fan of the air conditioning system is fixed to the one axial end part or its adjacent part of the shaft 20 and is rotated by a rotational force of the shaft 20.

A rotor 22 is integrally installed to a protruding part of the shaft 20, which protrudes from the tubular portion 34. The rotor 22 is configured into an inverted cup shaped body, which has an ceiling wall and a peripheral wall axially downwardly extending from the ceiling wall. The rotor 22 is coaxial with the tubular portion 34 and the support portion 36, which open in an opposite direction that is opposite from an opening direction of the opening end part of the housing 14. The shaft 20 extends through the ceiling wall of the rotor 22.

A generally cylindrical tubular rotor magnet 24 is coaxially fixed to an inner peripheral surface of the rotor 22. The rotor magnet 24 is radially magnetized, so that an N-pole is formed in one of a radially inner side and a radially outer side of each corresponding segment of the rotor magnet 24, and an S-pole is formed in the other one of the radially inner side and the radially outer side of the corresponding segment of the rotor magnet 24. Furthermore, the opposite magnetic poles are alternately arranged one after another in a circumferential direction about a rotational axis of the rotor magnet 24 to have alternating magnetic poles, each of which extends for a predetermined angle (e.g., 60 degrees) in the circumferential direction.

The rotor magnet 24 is placed outward of the stator 28 in the radial direction of the support portion 36 to radially oppose the stator 28. When the coils 30 are sequentially energized to generate the rotational magnetic field around the stator 28, a rotational force is generated at the rotor magnet 24 around the support portion 36 due to an interaction between thus generated rotational magnetic field and a magnetic field generated by the rotor magnet 24. Thereby, the shaft 20 is rotated.

The control circuit board 18 is placed on one axial side of the stator 28 where the bottom wall of the housing 14 is located. The control circuit board 18 has a printed circuit on at least one of a front surface and a rear surface of the control Circuit board 18. Furthermore, in the control circuit board 18, functional elements, such as resistance elements, transistor elements, a microcomputer (CPU), are appropriately connected through corresponding printed wiring in the printed circuit.

Next, the structure of the motor control apparatus 10 (the control circuit board 18) will be schematically described. The motor control apparatus 10 of the present embodiment executes a drive control operation of the motor 16 by pulsewidth modulation (PWM) control. The technique of the PWM control is well known and thereby will not be described for the sake of simplicity.

Figure 2:
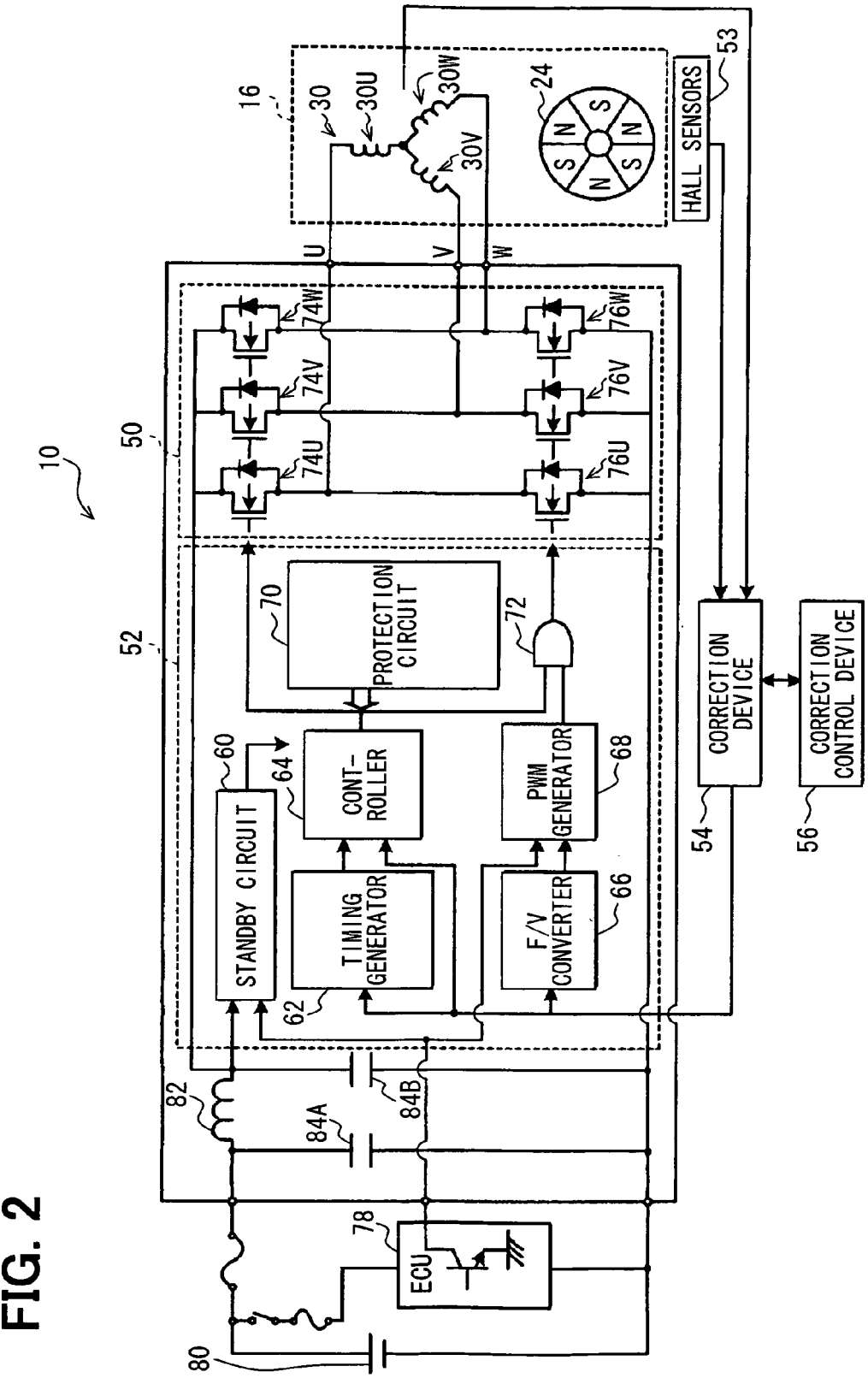
FIG. 2 is a block diagram showing a structure of a motor control apparatus of the motor actuator according to the first embodiment.

FIG. 2 is a block diagram showing an example of the structure of the motor control apparatus 10 of the present embodiment. In FIG. 2, the motor 16 is formed as a three-phase, six-pole motor.

The motor control apparatus 10 of the present embodiment includes a power supply device (serving as a power supply means) 50, a power supply control device (a power supply control means) 52, Hall sensors (Hall ICs or Hall elements serving as a rotational position sensing means) 53, a correction device (serving as a correction means) 54 and a correction control device (serving as a correction control means) 56. The motor control apparatus 10 further includes an air conditioning electronic control unit (ECU) 78, an electric power source 80, a power-factor improving reactor 82 and smoothing capacitors 84A, 84B. The electric power source 80, the power-factor improving reactor 82 and the smoothing capacitors 84A, 84B form a generally direct current electric power source, which supplies a generally direct current. The air conditioning ECU 78 is the electronic control unit of the vehicle air conditioning system. When a user turns on the vehicle air conditioning system through the air conditioning ECU 78, the motor 16 is rotated through a control operation executed by the motor control apparatus 10.

The power supply device 50 includes a three-phase (U-phase, V-phase and W-phase) inverter. As shown in FIG. 2, the power supply device 50 includes three N-channel field effect transistors (FETs) 74U, 74V, 74W, each of which serves as an upper switching element (or an upper semiconductor element). The power supply device 50 further includes three N-channel field effect transistors (FETs) 76U, 76V, 76W, each of which serves as a lower switching element (or a lower semiconductor element). When it is not necessary to distinguish the respective FETs 74U, 74V, 74W, these FETs will be collectively referred to as FETs 74. Also, when it is not necessary to distinguish the respective FETs 76U, 76V, 76W, these FETs will be collectively referred to as FETs 76. On the other hand, when it is necessary to distinguish the respective FETs 74, the alphabet "U", "V" or "W" will be added to the numeral 74. Also, when it is necessary to distinguish the respective FETs 76, the alphabet "U", "V" or "W" will be added to the numeral 76.

A source of the FET 74U and a drain of the FET 76U are connected to a terminal of the coil 30U. A source of the FET 74V and a drain of the FET 76V are connected to a terminal of the coil 30V. Furthermore, a source of the FET 74W and a drain of the FET 76W are connected to a terminal of the coil 30W.

The power supply control device 52 controls power supply timing of electric power supply from the power supply device 50 to the coils 30, i.e., controls energization timing of the coils 30 from the power supply device 50. The power supply control device 52 includes a standby circuit 60, a drive timing generator 62, a controller 64, an FN converter 66, a PWM generator 68, a protection circuit 70 and an AND circuit 72.

The standby circuit 60 controls the electric power supply from the electric power source 80 to each corresponding component. The standby circuit 60 of the present embodiment limits a weak current, which flows from the electric power source 80 to the air conditioning system, even in an air conditioning stop state.

The drive timing generator 62 generates the timing (timing signal) for driving the rotor 22 based on a position measurement signal, which is supplied from the Hall sensors 53 and indicates the sensed rotational position of the rotor 22. The controller 64 controls an angular velocity (advance angle) of the rotor 22 based on the drive timing generated by the drive timing generator 62 and the position measurement signals supplied from the Hall sensors 53.

The F/V converter 66 is a frequency/voltage converter that converts a frequency signal, which is proportional to the rotational speed (rpm) of the rotor 22, into a corresponding voltage and then outputs it to the PWM generator 68.

The PWM generator 68 generates and outputs a PWM signal that is a pulse signal having a pulse width, which corresponds to a level of the signal received from the air conditioning ECU 78, based on the output of the FN converter 66 and the output of the air conditioning ECU 78. The motor control apparatus 10 of the present embodiment controls the drive operation of the FETs 76 through the PWM control.

The protection circuit 70 is provided to limit a damage of the FETs 74, 76. Specifically, when an inappropriate electric current, which causes an excess load state, flows in the coils 30, the protection circuit 70 forcefully turns off all of the FETs 74, 76 to turn off the energization of the coils 30, i.e., to turn off the supply of the current to the coils 30.

An output terminal of the AND circuit 72 is connected the gate of each of the FETs 76. The AND circuit 72 outputs a high level (hereinafter, referred to as H-level) signal or a low level (hereinafter, referred to as L-level) signal to the gate of each of the FETs 76 based on the signal outputted from the controller 64 and the PWM signal outputted from the PWM generator 68. When the H-level signal is supplied to the gate of the FET 76, the FET 76 is placed in an ON state, so that the current flows from the drain to the source of the FET 76. In contrast, when the L-level signal is supplied to the gate of the FET 76, the FET 76 is placed in an OFF state, so that the current does not flow from the drain to the source of the FET 76.

The motor control apparatus 10 of the present embodiment has the Hall sensors 53 and a sensor magnet 40 (see FIG. 1).

Figure 3A:
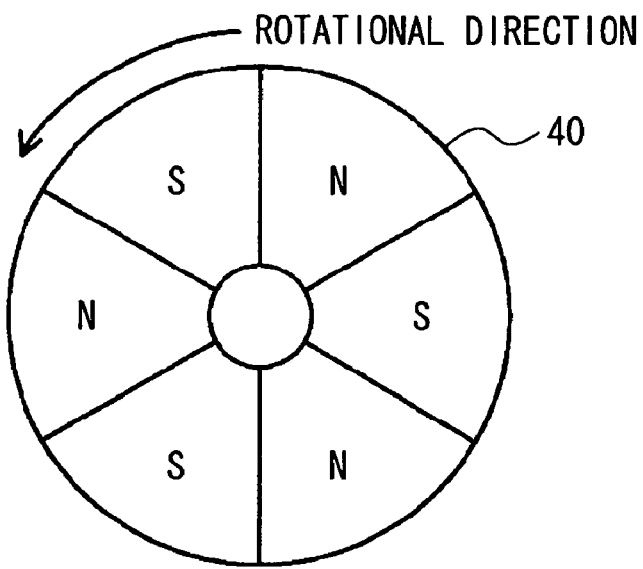
FIG. 3A is a schematic diagram showing a sensor magnet of the motor actuator of the first embodiment.

As shown in FIG. 1, the sensor magnet 40 is coaxially and integrally fixed to the other axial end part of the shaft 20. Similar to the rotor magnet 24, the sensor magnet 40 is a permanent magnet. With reference to FIG. 3A, the sensor magnet 40 is a multipolar magnet, in which N-poles and S-poles are alternately arranged one after another at predetermined angular intervals (e.g., 60 degree intervals) in the circumferential direction about the rotational axis.

Figure 3B:
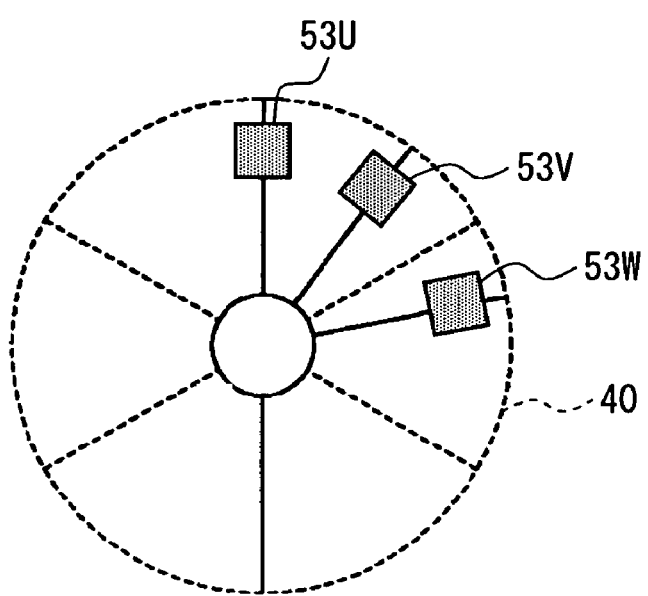
FIG. 3B is a schematic diagram showing a positional relationship of Hall sensors relative to the sensor magnet of the first embodiment.

The Hall sensors (Hall elements) 53 sense a magnetic field, which is generated by the sensor magnet 40, to sense the rotational position of the rotor 22. The Hall sensors 53 include three Hall sensors 53U, 53V, 53W, which correspond to the U-phase, the V-phase and the W-phase, respectively. With reference to FIG. 3B, the Hall sensors 53U, 53V, 53W are opposed to the sensor magnet 40 and are arranged one after another at 20 degree intervals in the circumferential direction about the rotational axis of the sensor magnet 40. The Hall sensors 53U, 53V, 53W sense the magnetic lines of flux, which constitute the magnetic field of the sensor magnet 40, and output position measurement signals (specifically, an output signal U, an output signal V and an output signal W), respectively.

Figure 4:
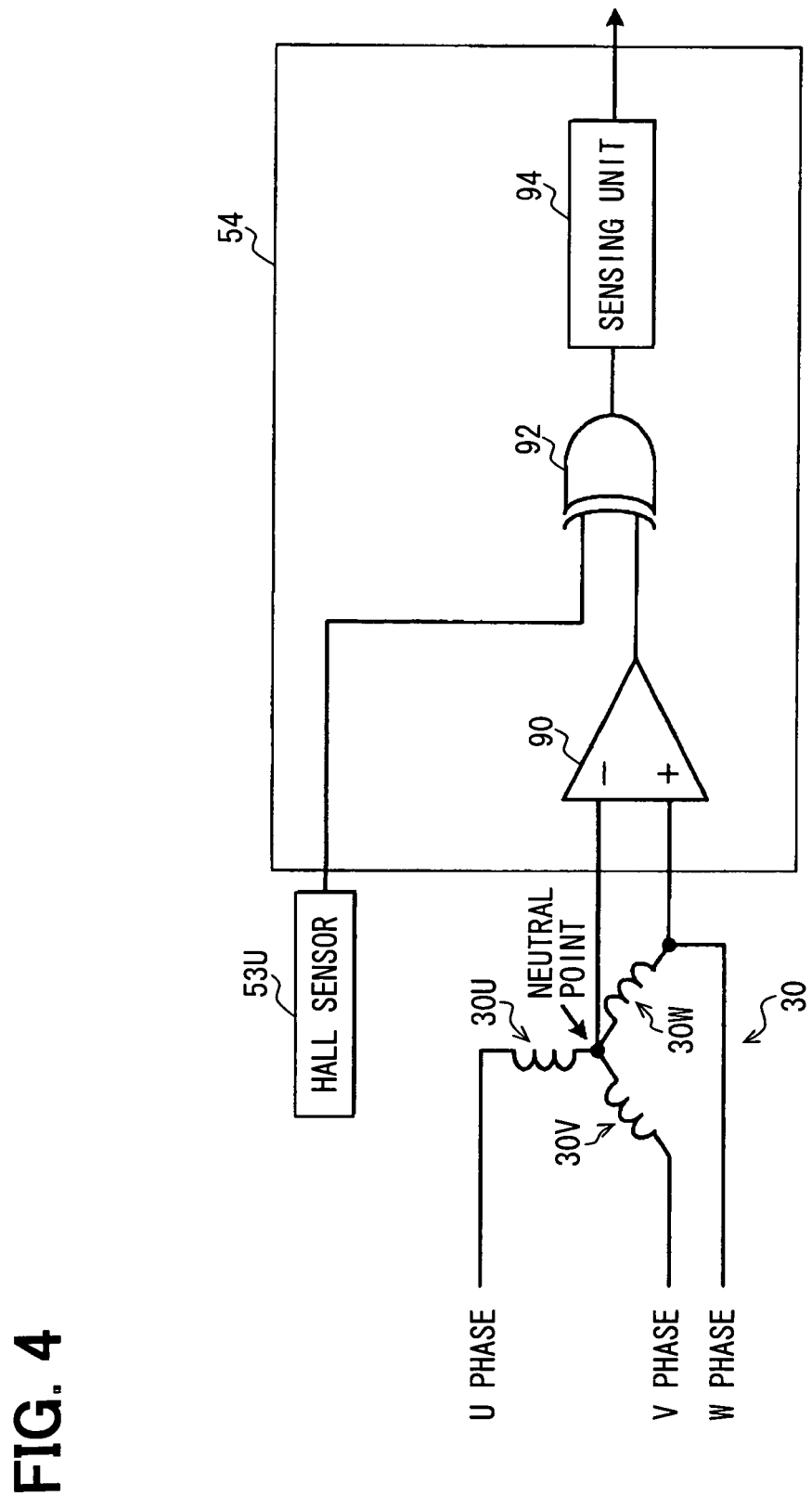
FIG. 4 is a block diagram schematically showing a structure of a correction device of the motor actuator of the first embodiment.

The correction device 54 senses a positional deviation(s) of the Hall sensors 53U, 53V, 53W relative to the sensor magnet 40 based on the output signals U, V, W received from the Hall sensors 53U, 53V, 53W, respectively, and the induced voltages (back electromotive forces) generated in the coils 30. Then, the correction device 54 corrects the sensed rotational position of the rotor 22, which is sensed with the Hall sensors 53U, 53V, 53W, based on the sensed positional deviation(s) of the Hall sensors 53U, 53V, 53W. As shown in FIG. 4, the correction device 54 includes a comparator 90, an EX-OR circuit 92 and a sensing unit 94.

One of two input terminals of the comparator 90 is connected to a neutral point of the coils 30, and the other one of the input terminals of the comparator 90 is connected to the terminal of the coil 30W. The EX-OR circuit 92 receives an output signal of the comparator 90 and an output signal of the Hall sensor 53U in this instance.

The sensing unit 94 senses the amount of positional deviation of the Hall sensors 53U, 53V, 53W relative to the sensor magnet 40 based on the output signal of the EX-OR circuit 92. The amount of positional deviation of the Hall sensor 53U, 53V, 53W relative to the sensor magnet 40 is sensed as an electrical angle. Then, the sensing unit 94 outputs the corrected output signal U, V, W of the Hall sensor 53U, 53V, 53W, which is corrected in view of the sensed amount of positional deviation of the Hall sensor 53U, 53V, 53W, to the power supply control device 52. The sensing unit 94 includes a central processing unit (CPU) and memories, such as a read only memory (ROM), a random access memory (RAM). The sensing unit 94 corrects the output signals U, V, W based on a value of correction data (hereinafter, referred to as a correction data value) stored in the corresponding memory thereof.

The correction control device 56 controls the timing of executing the correction operation (e.g., the timing of obtaining the correction data value) and the number of times of executing the correction operation. The correction control device 56 has a timer (not shown).

Now, a sensing and correcting operation for sensing and correcting a positional deviation of the Hall sensors 53U, 53V, 53W relative to the sensor magnet 40 executed in the motor control apparatus 10 will be described in detail.

Figure 5:
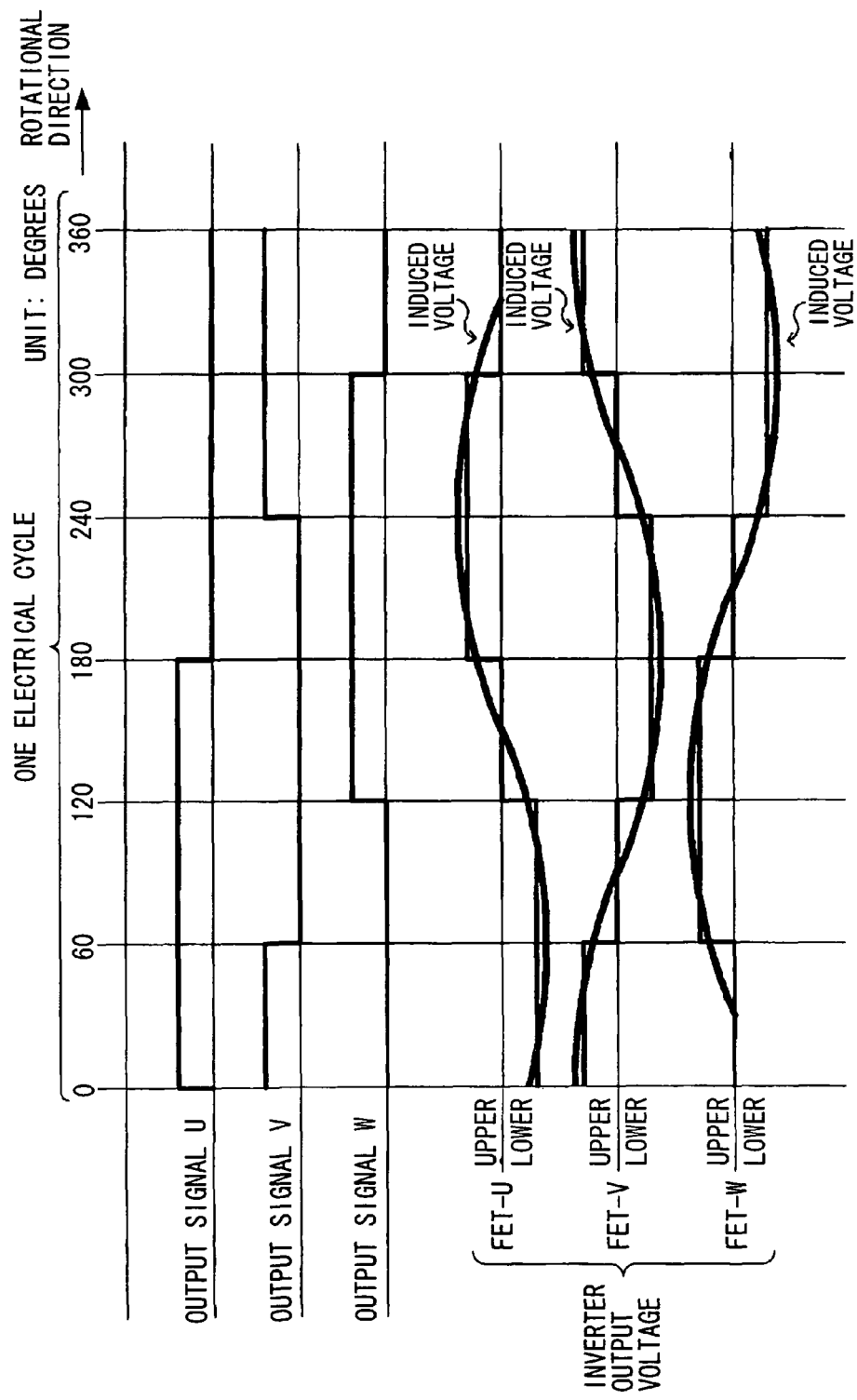
FIG. 5 is a time chart showing an ideal state for output signals of Hall sensors and inverter output voltages of a power supply device in a brushless motor of the motor actuator of the first embodiment.

FIG. 5 is an exemplary time chart showing the output signals U, V, W of the Hall sensors 53U, 53V, 53W and the inverter output voltages of the power supply device 50 in the motor 16 of the present embodiment for one electrical cycle (i.e., for the electrical angle of 360 degrees). Furthermore, FIG. 5 is the time chart in the state (see FIG. 3) where no positional deviation exists on the Hall sensors 53, i.e., in the ideal state. Furthermore, in FIG. 5, "UPPER" is for the output voltage of the corresponding upper FET 74, and "LOWER" is for the output voltage of the corresponding lower FET 76. When the output signal U, V, W is the H-level, it indicates the N-pole. In contrast, when the output signal U, V, W is the L-level, it indicates the S-pole.

Figure 7:
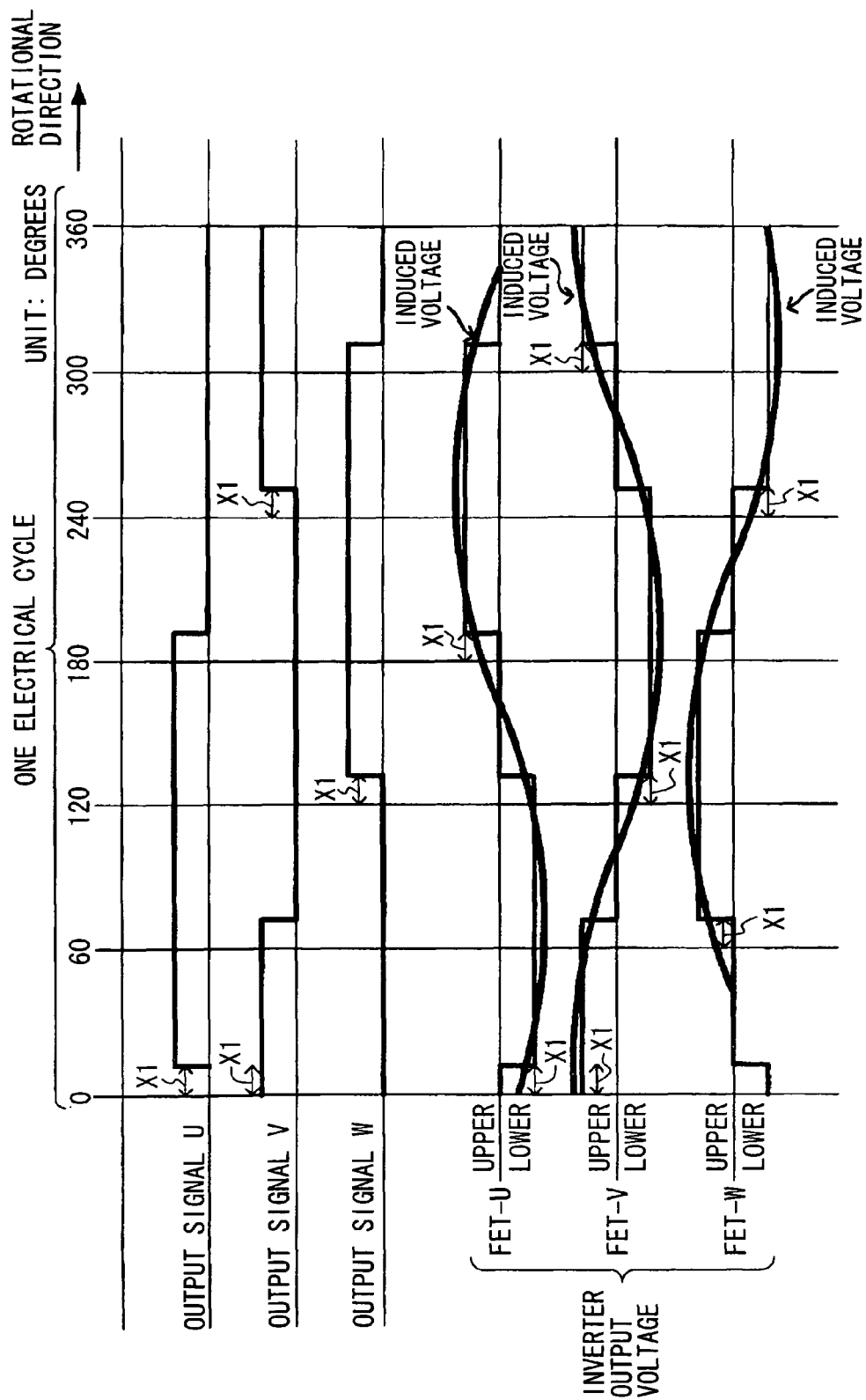
FIG. 7 is a time chart showing output signals of the Hall sensors and inverter output voltages of the power supply device in the brushless motor of the motor actuator of the first embodiment in an exemplary case where each of the Hall sensors is displaced from its proper position in the retarding direction.

FIG. 7 shows an exemplary time chart for a case where the Hall sensors 53U, 53V, 53W, which are placed one after another along an imaginary circle that is coaxial with the rotational axis of the sensor magnet 40, are deviated from the corresponding ideal locations, respectively, in a retarding direction with respect to the rotational direction of the sensor magnet 40. As shown in FIG. 7, a change in the output level (a change from the L-level to the H-level in this instance) of each output signal U, V, W is delayed by an electrical angle X1. In the present embodiment, the electrical angle, which corresponds to the positional deviation, is sensed based on the induced voltage. Then, the correction is made based on the sensed electrical angle, which corresponds to the positional deviation.

Figure 8:
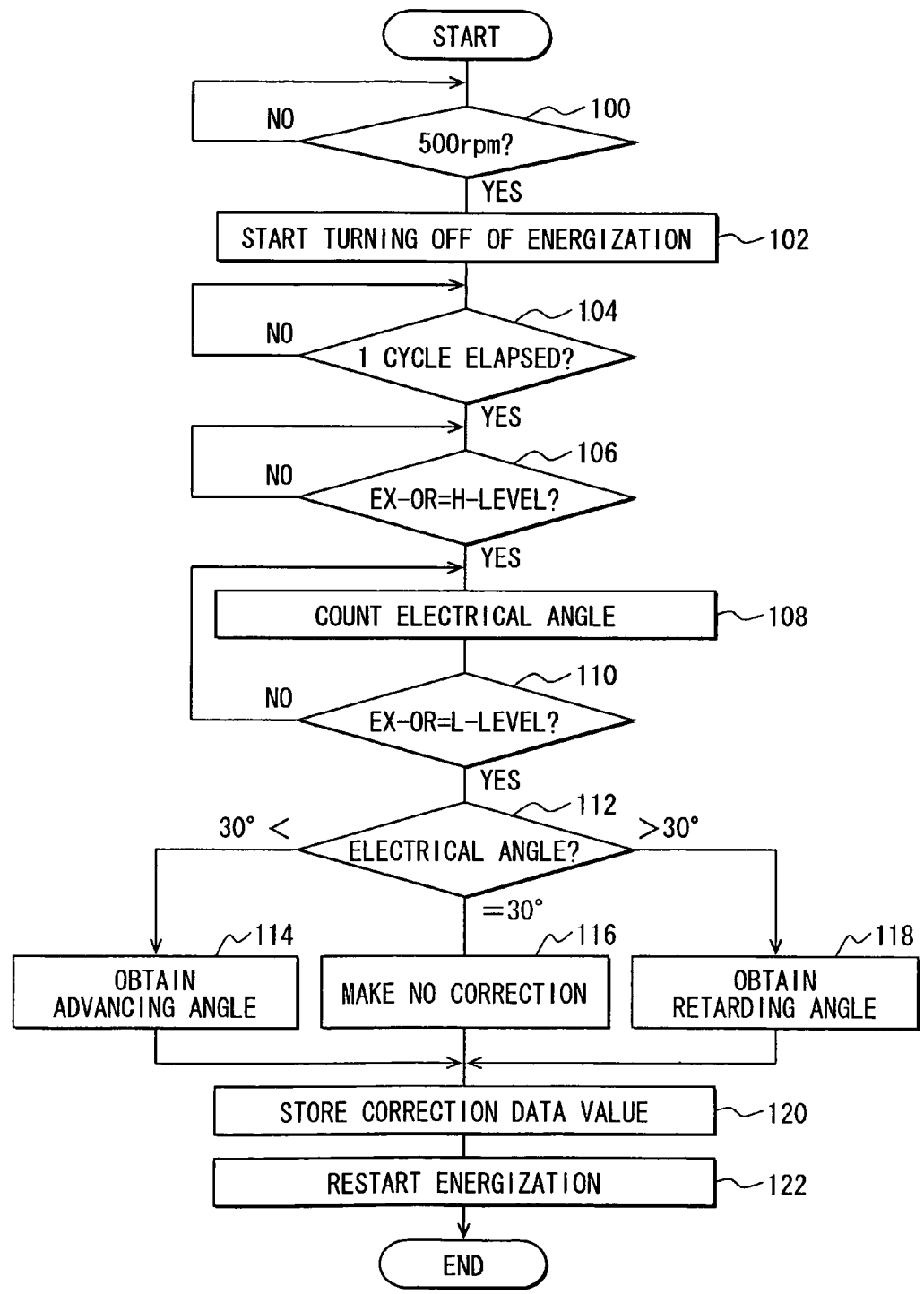
FIG. 8 is a flowchart showing a sensing and correcting operation for sensing and correcting the positional deviation of the Hall sensor according to the first embodiment.

FIG. 8 shows a flowchart indicating the sensing and correcting operation for sensing and correcting the positional deviation of the Hall sensors 53U, 53V, 53W relative to the sensor magnet 40. In the present embodiment, when the air conditioning system is turned on by the user to drive the motor actuator 12, the flowchart shown in FIG. 8 starts.

At step 100, it is determined whether the rotational speed (rpm) of the motor 16 (rotor 22) has reached a predetermined rotational speed, specifically 500 rpm in this instance. When it is determined that the rotational speed of the motor 16 (rotor 22) has not reached 500 rpm at step 100 (i.e., NO at step 100), this step 100 is repeated once again. In contrast, when it is determined that the rotational speed of the motor 16 (rotor 22) has reached 500 rpm at step 100 (i.e., YES at step 100), the operation proceeds to step 102. At step 102, the power supply control device 52 initiates, i.e., starts the turning off of the energization of the coils 30 from the power supply device 50.

In the present embodiment, when the rotational speed of the motor 16 (rotor 22) reaches 500 rpm right after the starting of the rotation, of the motor 16, more accurately when the rotational speed of the motor 16 (rotor 22) is in a range of 500 rpm ±50 rpm, the energization of the coils 30 is turned off, i.e., the motor output is turned off for all of the phases, and the correction data value, which is used to correct the positional deviation of the Hall sensor 53, is obtained.

Figure 9:
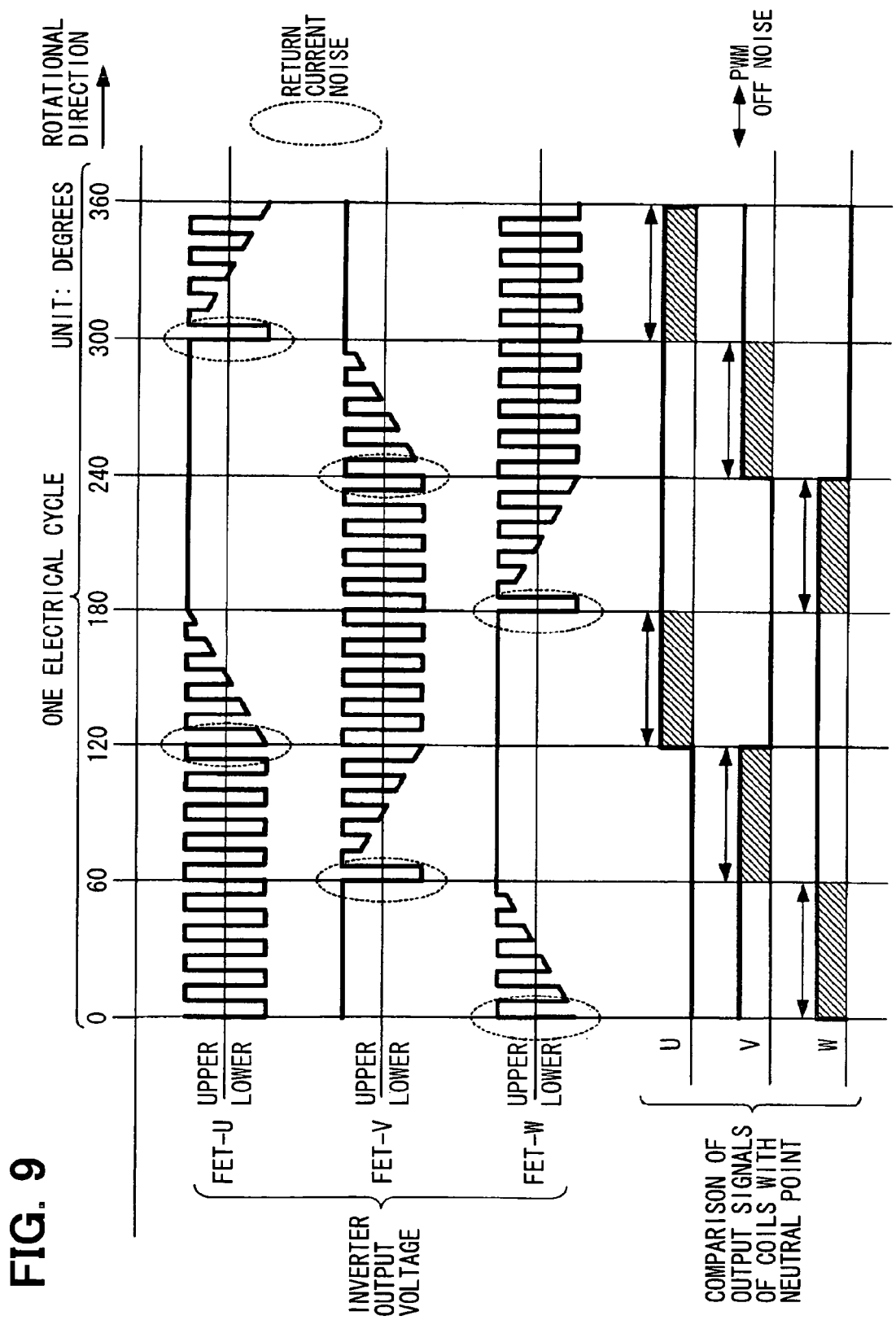
FIG. 9 is a time chart indicating a noise caused by a return current and a PWM off noise generated during the time of energization of the brushless motor according to the first embodiment.

In general, as shown in FIG. 9, a return current is generated at the moment of changing the energized phase from one phase to another phase in the energized state of the brushless motor. The return current results in a deformation of the induced voltage at the coil 30 of the corresponding phase, the energization of which is turned off (i.e., the coil 30 of the de-energized phase). Furthermore, at the time of controlling the energization state of the motor, the PWM control is executed. However, similar to the above case, as shown in FIG. 9, in the operation of monitoring the induced voltage at the coil 30 of the de-energized phase, the return current flows at the time of turning off of the PWM signal of the other phase, thereby resulting in a deformation of the induced voltage at the coil 30 of the de-energized phase. At the bottom side of FIG. 9, the output signal of the U-phase coil, the output signal of the V-phase coil and the output signal of the W-phase coil are compared with the voltage of the neutral point only for the period of the turning off thereof.

As indicated in FIG. 9, the waveform of the induced voltage is deformed in the energized state of the brushless motor in some cases.

In view of the above disadvantage, there has been also proposed a sensorless drive technique, which uses the induced voltage. According to this technique, for the purpose of sensing the zero-cross point of the induced voltage, there is executed a masking process for masking a result of comparison between an off time period of the PWM signal and a flow time period (current conducting time period) of the return, current after changing of the energized phase. However, in the case of such a technique, when the setting of the flow time period of the return current is inappropriate, the zero-cross point may be sensed at the delayed timing, which is delayed by the amount of the mask time period during the off mask period of the PWM signal. Thereby, there may be generated a deviation of the sensed timing of the zero-cross point relative to the ideal timing of the zero-cross point. As a result, a noisy sound and/or vibration may be increased.

According to the present embodiment, the energization of the coils 30 of the three phases are all turned off (de-energized) to permit free rotation of the motor 16 (the rotor 22) by inertia, so that the induced voltage of the de-energized, coils 30 is stabilized. In this stable state, the correction data value is obtained.

When the energization of the coils 30 is turned off during the high speed rotation of the motor 16, a noisy sound is generated to cause an uncomfortable feeling of the user. Therefore, it is desirable to turn off the energization of the coils 30 at a low rotational speed of the motor 16, at which a torque ripple is low due to a low current level, and thereby the noisy sound is less likely generated. However, it should be noted that the turning off of the energization of the coils 30 may possibly cause stalling of the motor 16 (decelerating and stopping of the motor 16). Therefore, the rotational speed of the motor 16 should be sufficiently increased at the time of obtaining the correction data value (i.e., at the time of turning off of the energization of the coils 30) to avoid the stop of the motor 16 caused by the stalling of the motor 16 during the time of obtaining the correction data value. As discussed above, when the energization of the coils 30 is turned off during the high speed rotation of the motor 16, the noisy sound may possibly be generated. In the present embodiment, the correction data value is obtained in the appropriate rotational state of the motor 16 where deceleration of the rotation of the motor 16 upon the turning off of the energization of the coils 30 in the middle of obtaining the correction data value will not result in a substantial problem. Also, in this rotational state of the motor 16, the rotational speed of the motor 16 is generally stabilized, and the turning off of the energization of the coils 30 does not cause the uncomfortable feeling of the user at the time of turning off of the energization of the coils 30.

In the present embodiment, a turning off time period for turning off the energization of the coils 30 is equal to or less than a period of one rotation of the motor 16 (the rotor 22), i.e., a period of one mechanical rotational cycle the motor 16 (the rotor 22).

Figure 10:
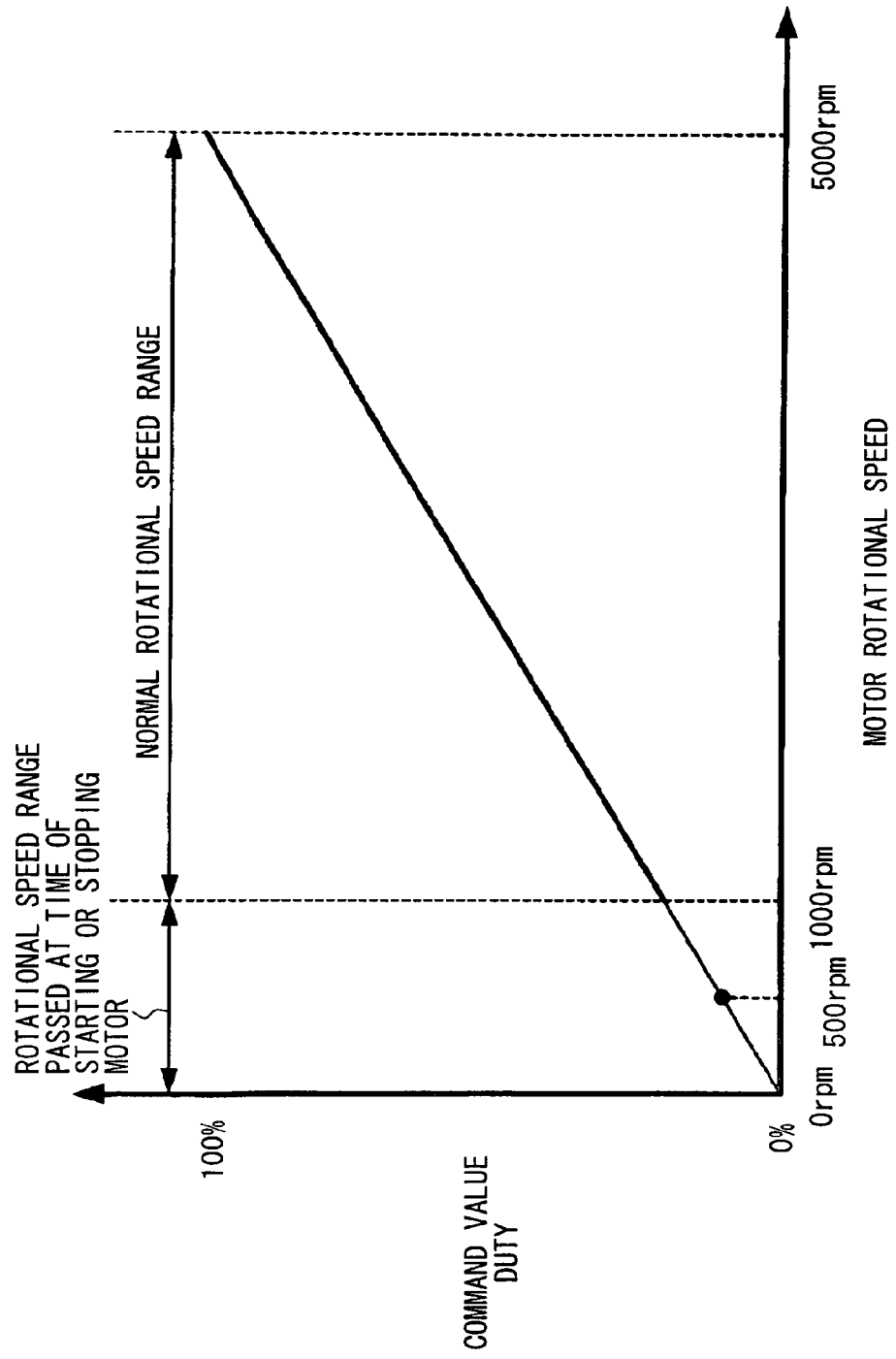
FIG. 10 is a diagram showing an exemplary relationship between the rotational speed of the motor and a command value DUTY according to the first embodiment.

Specifically, according to the present embodiment, when the rotational speed of the motor 16 (the rotor 22) falls in the range of 500 rpm±50 rpm after the starting of driving the motor 16, the energization of the coils 30 is turned off, and the correction data value is obtained. FIG. 10 shows a relationship between the rotational speed of the motor 16 and the command value DUTY. The normal rotational speed of the motor 16 is in a range of, for example, 1000 rpm to 5000 rpm. With reference to FIG. 10, in the range of 0 rpm to 1000 rpm, the user will not have the uncomfortable feeling, which would be caused by, for example, the noisy sound and vibrations, since this range will be only passed at the time of starting or stopping the driving of the motor 16.

The rotational speed of 500 rpm±50 rpm is chosen as an appropriate rotational speed from the above range of 0 rpm to 1000 rpm due to the following reasons. That is, at the rotational speed of 500 rpm±50 rpm, even when the energization of the coils 30 is turned off, the problem of stopping of the motor 16 or the like will not occur during the time period of obtaining the correction data value, specifically the time period of one rotation of the motor 16 (the rotor 22), i.e., the time period of one mechanical rotational cycle of the motor 16 (the rotor 22). Also, at the rotational speed of 500 rpm±50 rpm, the user will not have the substantial uncomfortable feeling from the free rotation of the motor 16 (the rotor 22) by inertia after the turning off of the energization of the coils 30. Furthermore, at the rotational speed of 500 rpm±50 rpm, the zero-cross point of the induced voltage can be reliably determined through use of the comparator 90 after the turning off of the energization of the coils 30. This appropriate rotational speed of the motor may vary depending on, for example, the normal rotational speed of the motor 16. Therefore, desirably, this appropriate rotational speed of the motor 16 is a value obtained through experiments or the like in advance.

In the motor 16 of the present embodiment, a correct output signal may not be obtained immediately after the turning off of the energization of the coils 30 due to the influence of the return current to the output-side FETs 74, 76 in some cases. Furthermore, the core 26 is suspended with aid of rubber support elements to limit conduction of vibrations from the core 26 to the other components and thereby to reduce a noise level during the operation of the motor 16. Therefore, at the time immediately after the turning off of the energization of the coils 30, the core 26 may be swung by a reaction force of the rubber elements, and thereby the normal correction data value may not be obtained under such a circumstance. According to the present embodiment, it has been experimentally confirmed that the normal correction data value can be obtained without encountering the above disadvantages after elapsing of a period of one electrical cycle (i.e., the electrical angle of 360 degrees) since the time of turning off of the energization of the coils 30. Therefore, in the present embodiment; the correction data value is obtained after the elapsing of the period of one electrical cycle.

Therefore, after step 102, at which the turning off of the energization of the coils 30 is started, the operation proceeds to step 104. At step 104, it is determined whether the period of one electrical cycle has been elapsed since the time of turning off of the energization of the coils 30 at step 102. In the present embodiment, the correction control device 56 determines whether the time period of one electrical cycle has been elapsed since the time of turning off of the energization of the coils 30. When it is determined that the time period of one electrical cycle has not been elapsed since the time of turning off of the energization of the coils 30 at step 104, this step 104 is repeated. In contrast, when it is determined that the time period of one electrical cycle has been elapsed since the time of turning off of the energization of the coils 30 at step 104, the operation proceeds to step 106.

Figure 11:
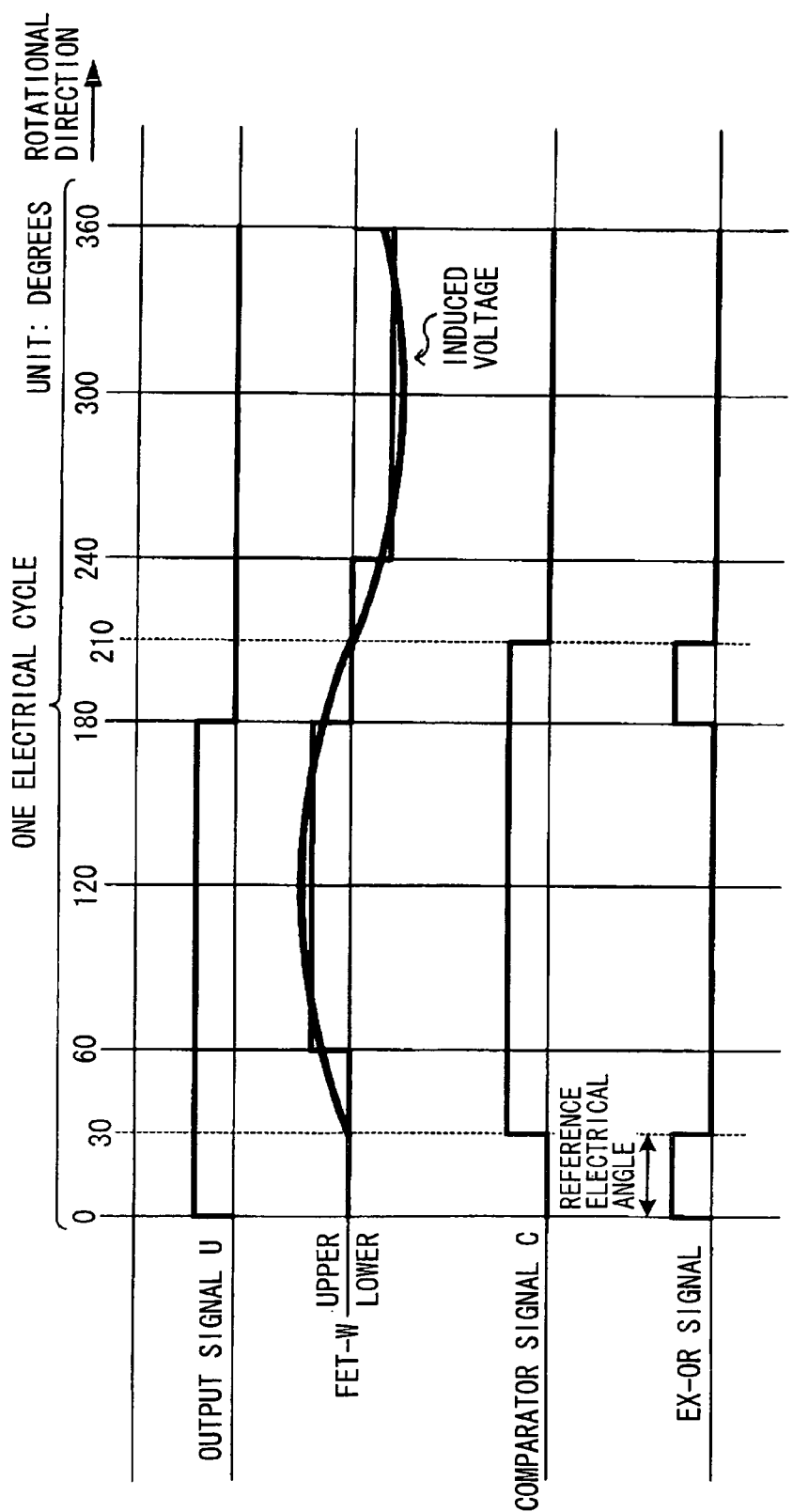
FIG. 11 is a time chart showing an operation of the correction device of the first embodiment.

Now, the operation of the correction device 54 of the present embodiment will be described with reference to FIG. 11. The comparator 90 compares the induced voltage of the coil 30W and the voltage (electrical potential) of the neutral point and outputs an H/L signal, which indicates the H-level or the L-level of the result of the comparison, as a comparator signal C. The comparator signal C is outputted at the ideal timing, at which the positional deviation of the Hall sensor 53 has no influence. The EX-OR circuit 92 outputs an EX-OR signal, which is an exclusive OR of the comparator signal C and the output signal U of the Hall sensor 53U. In the ideal state, the output phase is changed at the timing, which is displaced by the electrical angle of 30 degrees from the zero-cross point of the induced voltage of the motor 16 (see FIG. 5). Specifically, in the case of FIG. 11 where an electrical angle of a period, during which the EX-OR signal is held in the H-level, is 30 degrees, the position of the Hall sensor 53U is not deviated from its proper position. The sensing unit 94 stores the electrical angle of 30 degrees, which should be obtained under the ideal state, as a standard electrical angle. Furthermore, the sensing unit 94 senses the positional deviation of the Hall sensor 53U based on an electrical angle difference between the electrical angle of the period, during which the EX-OR signal is held in the H-level, and the electrical angle of 30 degrees. Thereafter, the sensing unit 94 stores the electrical angle difference in the memory thereof as the correction data value.

Therefore, at step 106, it is determined whether the EX-OR signal is in the H-level. When the EX-OR signal is in the L-level, NO is returned at step 106, and this step 106 is repeated. In contrast, when the EX-OR signal is in the H-level, YES is returned at step 106, thereby proceeding to step 108. At step 108, an electrical angle (or an elapsed time period) is counted since the time of returning YES at step 106. Then, at step 110, it is determined whether the EX-OR signal is in the L-level. When the EX-OR signal is still in the H-level, NO is returned at step 110. In such a case, the operation returns to step 108 once again, and the counting of the electrical angle (or the elapsed time) is repeated. In contrast, when the EX-OR signal is changed to the L-level, YES is returned at step 110, thereby proceeding to step 112.

At step 112, a value of the counted electrical angle, i.e., the electrical angle of the period, during which the EX-OR signal is held in the H-level, is determined. With reference to FIG. 12B, in a case where the counted electrical angle is smaller than 30 degrees, the operation proceeds to step 114. At step 114, a difference (electrical angle difference) X2 between the counted electrical angle and the electrical angle of 30 degrees is obtained as a correction data value (advancing electrical angle required for advancing the output signal U). In contrast, with reference to FIG. 12A, in a case where the position of the Hall sensor 53U is not deviated from its proper position, i.e., when the counted electrical angle is 30 degrees, the operation proceeds to step 116. At step 116, no correction is made (i.e., correction data value=0 degrees). Furthermore, with reference to FIG. 12C, in a case where the output signal U is advanced, and thereby the value of the counted electrical angle is larger than 30 degrees, the operation proceeds to step 118. At step 118, a difference (electrical angle difference) X3 between the counted electrical angle and the electrical angle of 30 degrees is obtained as a correction data value (retarding electrical angle required for retarding the output signal U).

After step 114, 116 or 118, the operation proceeds to step 120. At step 120, the sensing unit 94 stores the correction data value in the memory thereof. Thereafter, at step 122, the power supply control device 52 terminates (stops) the turning off of the energization of coils 30, i.e., the power supply control device 52 restarts the energization of the coils 30, and the present operation is terminated. When the energization of the coils 30 is restarted, the electric current is supplied from the power supply device 50 to the coils 30 of the corresponding phases.

With the above operation, the positional deviation of the Hall sensor 53U is sensed. Therefore, the correction device 54 corrects the output signal U, V, W of the Hall sensor 53 based on the correction data value, which is stored in the memory of the sensing unit 94. Then, the correction device 54 outputs the corrected output signals U, V, W of the Hall sensors 53 to the power supply control device 52. For example, in the case of FIG. 12B, the signal output timing is advanced by the amount of the electrical angle X2. Furthermore, in the case of FIG. 12C, the signal output timing is retarded by the amount of the electrical angle X3. In this way, the positional deviation of the Hall sensor 53U can be corrected.

In the present embodiment, the sensing unit 94 of the correction device 54 measures the output of the EX-OR circuit 92. However, the present invention is not limited to this. For example, instead of the output of the EX-OR circuit 92, the change in the output signal U and the change in the comparator signal C may be measured. Furthermore, in the present embodiment, the electrical angle of the period, during which the output of the EX-OR circuit 92 is held in the H-level, is measured. However, the present invention is not limited to this. For example, an electrical angle of a period, during which the output of the EX-OR circuit 92 is held in the L-level, may be alternatively measured. Also, in the above embodiment, the correction device 54 senses the positional deviation of the Hall sensor 53U based on the output signal U and the induced voltage of the coil 30W. However, the present invention is not limited to this. For example, the positional deviation of the Hall sensor 53U may be sensed based on the output signal U and the induced voltage of one of the coil 30V and the coil 30U. Similarly, a positional deviation of the Hall sensor 53V may be sensed based on the output signal V and the induced voltage of one of the coil 30U, the coil 30V and the coil 30W. Also, a positional deviation of the Hall sensor 53W may be sensed based on the output signal W and the induced voltage of one of the coil 30U, the coil 30V and the coil 30W.

Figure 6:
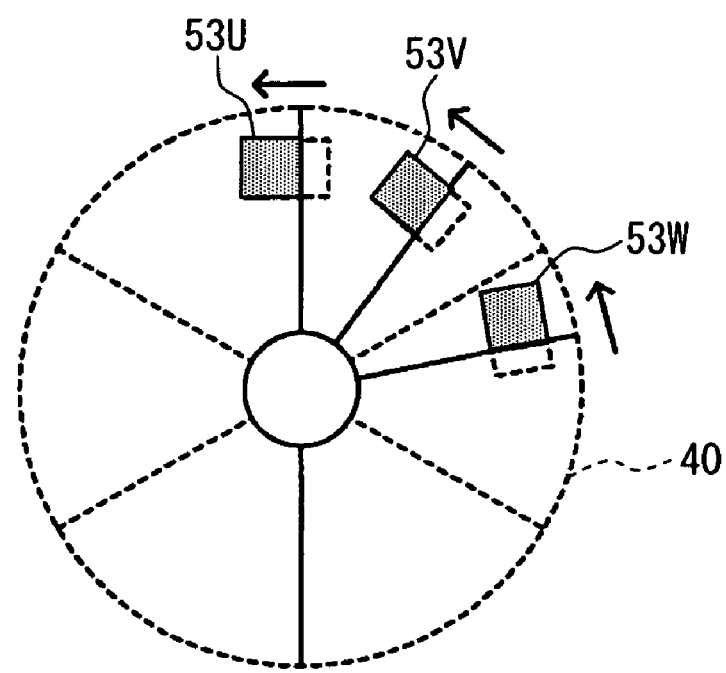
FIG. 6 is a schematic view showing an exemplary case where each of the Hall sensors of the first embodiment is displaced from its proper position in a retarding direction with respect to a rotational direction of the sensor magnet.

Also, the coils 30 of the present embodiment are discussed as the stator coils having the star connection (see FIGS. 2 and 4). However, the present invention is not limited to this. For instance, the coils 30 may be stator coils having a delta connection. In the case where the stator coils having the delta connection are used, a pseudo-neutral point may be formed, and an induced voltage, which is outputted from the pseudo-neutral point, may be supplied to the minus (−) input terminal of the comparator 90. Also, the six-pole motor is depicted and discussed (see FIGS. 2, 3 and 6). However, the present invention is not limited to this. That is, the number of the poles is not limited to six and may be changed to any appropriate number. Even with this modification, it is possible to detect the positional deviation of the Hall sensors 53.

In the present embodiment, the correction data value is obtained after the elapsing of the period of one electrical cycle. Alternatively, the correction control device 56 may be configured to control the sensing unit 94 such that the sensing unit 94 ignores the signal inputted thereto until the elapsing of the period of one electrical cycle. Further alternatively, the correction control device 56 may be configured to prevent the input of the signal to the comparator 90 or the EX-OR circuit 92 until the elapsing of the period of one electrical cycle.

Furthermore, in the present embodiment, the turning off of the energization of the coils 30 is terminated, i.e., the energization of the coils 30 is restarted upon the storing of the correction data value in the memory of the sensing unit 94. However, the present invention is not limited to this. For example, the energization of the coils 30 may be immediately restarted upon the obtaining of the electrical angle of the period, during which the EX-OR signal is held in the H-level. In this way, the period of the turning off of the energization of the coils 30 can be further reduced.

Furthermore, when the motor 16 (the rotor 22) is rotated by inertia upon the turning off of the energization of the coils 30, the rotational speed of the motor 16 is reduced, thereby increasing a difference between the actual rotational speed of the motor 16 and the commanded rotational speed (the command value). Therefore, the feedback control for controlling the rotational speed of the motor 16 is temporarily stopped during the rotation of the motor 16 (the rotor 22) by inertia. This is due to the following reason. That is, when the feedback control for controlling the rotational speed of the motor 16 is not stopped, the computation, which increases the drive DUTY, is progressed. In such a case, when the energization of the coils 30 is restarted after the elapsing of the period of one electrical cycle, a rapid torque change occurs due to a large difference between the DUTY value at the time immediately before the turning off of the energization of the coils 30 and the DUTY value at the time immediately after the restarting of the energization of the coils 30, thereby resulting in generation of a noisy sound. In order to limit this, the feedback control for controlling the rotational speed of the motor 16 is temporarily stopped at the time of rotating the motor 16 (the rotor 22) by inertia.

Furthermore, in the present embodiment, it is monitored that the motor 16 (the rotor 22) is not rotated through one complete rotation within the predetermined time period, i.e., it is monitored that one mechanical rotational cycle of the motor 16 takes more than the predetermined time period. When the motor 16 (the rotor 22) is not rotated through one complete rotation within the predetermined time period, i.e., when the one mechanical rotational cycle of the motor 16 takes more than the predetermined time period, it is assumed that an excessive load is applied to the motor 16 and the motor control apparatus 10 by, for example, application of an external force or an occurrence of locking of the rotation of the motor 16. Thereby, in such a case, the correction data value is not obtained. When the excessive load is applied, the normal correction data value cannot be obtained, and thereby the resultant correction data value may possibly be erroneous. Therefore, when the correction is made with the erroneous correction data value, the appropriate correction cannot be made.

As discussed above, in the present embodiment, when the rotational speed (rpm) of the motor 16 (rotor 22) has reached 500 rpm, the power supply control device 52 turns off the electric power supply from the power supply device 50 to the coils 30. The correction control device 56 controls the correction device 54 to obtain the correction data value, which is used to correct the positional deviation of the Hall sensor 54U after the elapsing of the period of one electrical cycle since the time of turning off of the energization of the coils 30. The comparator 90 of the correction device 54 outputs the comparator signal C, which is obtained by the comparison between the voltage at the neutral point of the coils 30 and the induced voltage of the coil 30W. The EX-OR circuit 92 outputs the EX-OR signal, which is the exclusive OR of the comparator signal C and the output signal U of the Hall sensor 53U. The sensing unit 94 obtains the electrical angle of the period, during which the EX-OR signal is held in the H-level. Then, the sensing unit 94 stores the difference between the obtained electrical angle and the standard electrical angle of 30 degrees in the memory of the sensing unit 94 as the correction data value. When the correction device 54 obtains the correction data value, the power supply control device 52 restarts the energization of the coils 30 through the power supply device 50. Specifically, the sensing unit 94 of the correction device 54 determines whether the relationship between the output signal of the Hall sensor 53 and the induced voltage of the coil 30 satisfies the time chart shown in FIG. 5, i.e., determines the deviation electrical angle to sense the positional deviation of the Hall sensor 53. Furthermore, the sensing unit 94 of the correction device 54 stores the sensed positional deviation as the correction data value.

As discussed above, according to the present embodiment, the correction data value is obtained after the elapsing of the period of one electrical cycle, during which the noise is likely generated in the output signal, since the time of turning off of the energization of the coils 30. Therefore, the stable output signal can be obtained, and thereby the appropriate correction data value can be obtained. As a result, the relative positional deviation between the sensor magnet 40 and the Hall sensor 53U, 53V, 53W can be appropriately corrected.

Also, the appropriate correction data value can be obtained within the period of one rotation (one mechanical rotational cycle) of the motor 16, so that the correction data value can be quickly obtained. Therefore, the time period of the turning off of the energization of the coils 30 can be reduced, and thereby the generation of the noisy sound or vibration, which would be caused by lengthening of the time period of the turning off of the energization of the coils 30, can be limited to avoid the uncomfortable feeling of the user.

Furthermore, according to the present embodiment, the correction data value is obtained when the rotational speed of the motor 16 (rotor 22) falls in the range of 500 rpm±50 rpm after the starting of the rotation of the motor 16. Therefore, even when the energization of the coils 30 is turned off, the generation of the noisy sound or vibration can be limited to avoid the uncomfortable feeling of the user.

As discussed above, according to the present embodiment, the relative positional deviation between the sensor magnet 40 and the Hall sensor 53U, 53V, 53W can be corrected accurately at the low costs without causing the uncomfortable feeling of the user while minimizing the time period of the turning off of the energization of the coils 30.

(Second Embodiment)

A second embodiment of the present invention will now be described. The second embodiment is similar to the first embodiment except that the way of obtaining the correction data value (the number of times of receiving the output signal) is different from that of the first embodiment. Therefore, in the following discussion, the way of obtaining the correction data value according to, the second embodiment will be mainly discussed.

According to the first embodiment, the appropriate correction data value is obtained after the elapsing of the period of one electrical cycle, during which the noise is likely generated in the output signal, since the time of turning off of the energization of the coils 30. However, in some cases, a noise may possibly be generated at the time of obtaining the correction data value (at the time of receiving the output signal) due to, for example, an external factor. In order to counteract this situation, in the present embodiment, the output signal (the electrical angle) is received multiple times to obtain the correction data value.

Figure 13:
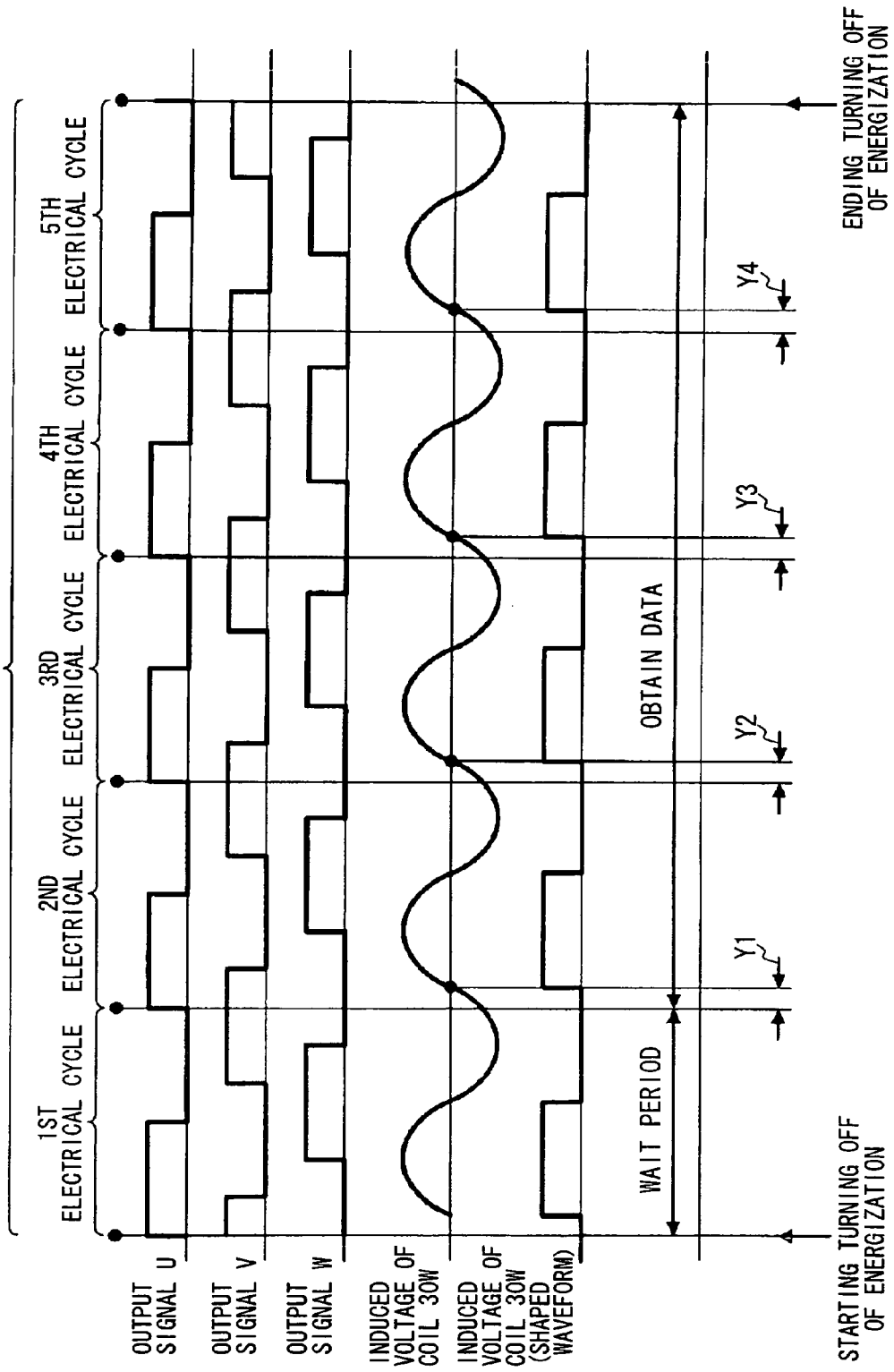
FIG. 13 is a time chart showing an operation of a correction device according to a second embodiment of the present invention.

FIG. 13 shows an exemplary time chart for obtaining the correction data value at the correction device 54 of the present embodiment. Furthermore, FIG. 13 shows one rotation of the ten-pole motor 16, i.e., shows five electrical cycles (first to fifth electrical cycles).

The correction device 54 obtains an electrical angle Y1 from a rising edge of the output signal U of the Hall sensor 53U to a zero-cross point of the induced voltage of the coil 30W after the elapsing of the period of one electrical cycle since the time of turning off of the energization of the coils 30. Furthermore, the correction device 54 obtains an electrical angle Y2 from a next rising edge of the output signal U of the Hall sensor 53U to a next zero-cross point of the induced voltage of the coil 30W. This process is repeated until elapsing of four electrical cycles (within one mechanical rotational cycle of the motor 16), so that subsequent electrical angles Y3, Y4 are similarly obtained. Furthermore, the correction device 54 computes an average value (average electrical angle) of the obtained electrical angles Y1 to Y4 as a deviation data value by an equation of (Y1+Y2+Y3+Y4)/4. Then, the correction device 54 obtains and stores a difference between the computed deviation data value (the average electrical angle) and the standard electrical angle of 30 degrees as a correction data value.

In the case of FIG. 13, the four electrical angles Y1-Y4, each of which is from the corresponding rising edge of the output signal U to the corresponding zero-cross point of the induced voltage of the coil 30W, are obtained. However, the present embodiment is not limited to this. For example, in place of the four electrical angles Y1-Y4 discussed above, four electrical angles, each of which is from a corresponding falling edge of the output signal U to a corresponding zero-cross point of the induced voltage of the coil 30W, may be obtained.

As discussed above, according to the present embodiment, the electrical angle (electrical angle Y1-Y4) from the rising edge of the output signal U to the zero-cross point of the induced voltage of the coil 30W is obtained four times within the period of one mechanical rotational cycle of the motor 16 (the rotor 22) after the elapsing of the period of one electrical cycle since the time of turning off of the energization of the coils 30. Then, the difference between the average value of the obtained electrical angles and the standard electrical angle is stored as the correction data value.

In this way, according to the present embodiment, the relative positional deviation between the sensor magnet 40 and the Hall sensor 53U, 53V, 53W can be corrected more accurately in comparison to the case where the output signal is obtained only once while minimizing the time period of the turning off of the energization of the coils 30.

Furthermore, according to the present embodiment, it is assumed that the induced voltage of the coil 30 is uniform (i.e., the pole pitches of the rotor magnet 24 are constant). However, even in a case where a deviation(s) exists in the pole pitches, since the output signal is obtained multiple times, the noisy sound and the vibration can be reduced by correcting the positional deviation(s) as long as the deviation(s) in the pole pitches is relatively small.

(Third Embodiment)

A third embodiment of the present invention will now be described. The third embodiment is similar to the second embodiment except that the way of obtaining the correction data value (the period of the electrical angle to be obtained) is different from that of the second embodiment. Therefore, in the following discussion, the way of obtaining the correction data value according to the third embodiment will be mainly discussed.

Figure 14A:
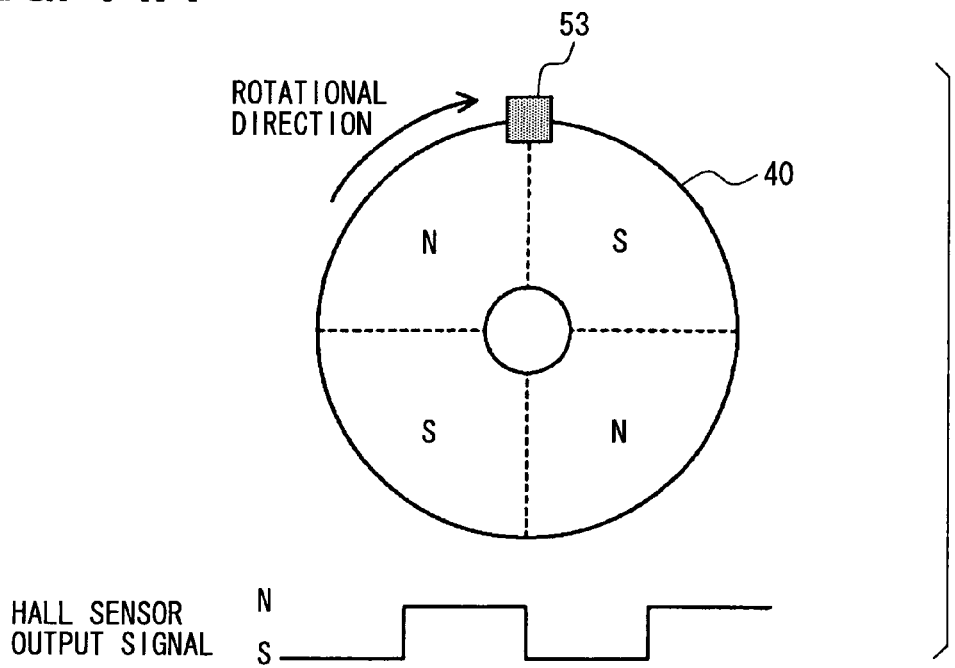
FIG. 14A is a descriptive diagram showing an exemplary case where no deviation exists in pole pitches of a sensor magnet according to a third embodiment of the present invention.
Figure 14B:
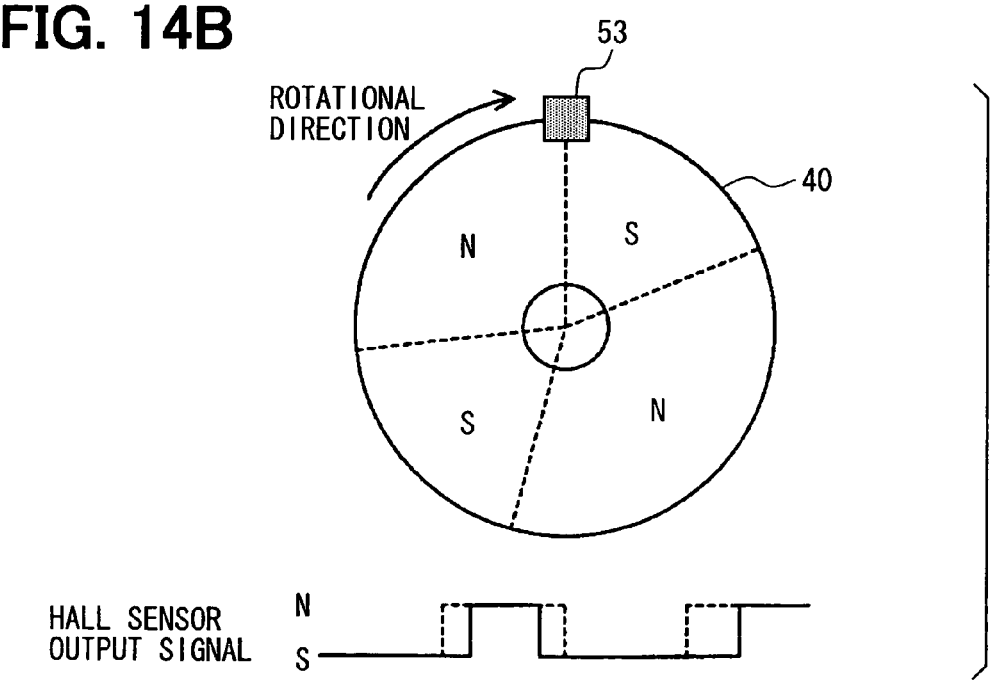
FIG. 14B is a descriptive diagram showing an exemplary case where deviations exist in the pole pitches of the sensor magnet according to the third embodiment.

In the second embodiment, the electrical angles Y1-Y4, each of which is from the corresponding rising edge of the output signal U to the zero-cross point of the induced voltage of the coil 30W, are obtained. However, in a case where a deviation(s) exists in pole pitches of the sensor magnet 40, a deviation may exist in the electrical angles Y1-Y4. FIG. 14A shows a relationship between the sensor magnet 40 and the Hall sensor output signal in the case where the deviation does not exist in the pole pitches of the sensor magnet 40. FIG. 14B shows a relationship between the sensor magnet 40 and the Hall sensor output signal in the case where the deviation exists in the pole pitches of the sensor magnet 40. Furthermore, FIGS. 14A and 14B show the sensor magnet 40 having four magnetic poles. As shown in FIGS. 14A and 14B, the Hall sensor output signal is outputted in conformity with the pole pitches of the sensor magnet 40. Therefore, even in a case where each of the Hall sensors 53 is placed in its normal position, the pitches of the H-level and of the L-level of the Hall sensor output signal may become unequal. Therefore, in the present embodiment, an electrical angle from the reference timing after the turning off of the energization of the coils 30 to a zero-cross point of the induced voltage in each corresponding electrical cycle is obtained to obtain the correction data value.

FIG. 15 shows an exemplary time chart for obtaining the correction data value at the correction device 54 of the present embodiment. The correction device 54 of the present embodiment obtains the electrical angle from the timing (serving as the reference timing) of rising of the output signal U (i.e., the timing of generation of the rising edge of the output signal U) in a second electrical cycle after the turning off of the energization of the coils 30 to a corresponding zero-cross point of the induced voltage of the coil 30W for each of the second to fifth cycles. Therefore, as shown in FIG. 15, an electrical angle Z1 from the reference timing to a zero-cross point in the second electrical cycle, an electrical angle Z2 from the reference timing to a zero-cross point in the third electrical cycle, an electrical angle Z3 from the reference timing to a zero-cross point in the fourth electrical cycle and an electrical angle Z4 from the reference timing to a zero-cross point in the fifth electrical cycle are obtained.

Furthermore, the correction device 54 computes a difference (offset value) between each of the electrical angles Z1-Z4 and its corresponding predetermined electrical angle, which is specific to the associated electrical cycle, and then computes the deviation data value as the electrical angle like that of the electrical angles Y1-Y4 of the second embodiment.

The deviation data value of the present embodiment will be indicated by the following equation.

$$\text{Deviation Data Value} = (Z1 + (Z2 - 360) + (Z3 - 360 \times 2) + (Z4 - 360 \times 3))/4$$

Furthermore, a difference between the deviation data value and the standard electrical angle of 30 degrees is obtained as the correction data value and is stored in the memory of the sensing unit 94 of the correction device 54.

The equation of the deviation data value is not limited to the above equation. For instance, instead of obtaining the deviation data value through the above equation, an equation for obtaining the correction data value may be created to compute an average value of differences, each of which is between the above offset value (i.e., Z1, (Z2−360), (Z3−360×2), or (Z4−360×3)) of the corresponding one of the second to fifth electrical cycles and the standard electrical angle.

As discussed above, in the present embodiment, the correction device 54 of the present embodiment obtains the electrical angle Z1-Z4 from the timing (serving as the reference timing) of rising of the output signal U (i.e., the timing of generation of the rising edge of the output signal U) in the second electrical cycle after the turning off of the energization of the coils 30 to the zero-cross point of the induced voltage of the coil 30W for each of the second to fifth electrical cycles. Then, the correction device 54 computes the difference between each of the electrical angles Z1-Z4 and its corresponding predetermined electrical angle, which corresponds to the associated electrical cycle, and computes the difference between the average value of these differences and the standard electrical angle as the correction data value, which is then stored.

In the present embodiment, even in the case where the deviation exists in the pitches of the output signal due to the presence of the deviation in the pole pitches of the sensor magnet 40, the induced voltage of the coil 30W is not substantially affected, and thereby the deviation does not substantially exist in the induced voltage. As a result, the influence of the deviation in the pole pitches of the sensor magnet 40 can be substantially eliminated, and the relative positional deviation between the sensor magnet 40 and the Hall sensor 53U, 53V, 53W can be corrected accurately while minimizing the time period of the turning off of the energization of the coils 30.

(Fourth Embodiment)

A fourth embodiment of the present invention will now be described. The third embodiment is discussed with reference to the case where the deviation exists in the pole pitches of the sensor magnet 40. However, the above-discussed correction for correcting the positional deviation of the Hall sensors 53 can be also made in a case where the Hall sensors 53 are used to sense the magnetic flux of the rotor magnet 24 instead of the sensor magnet 40.

Figure 16:
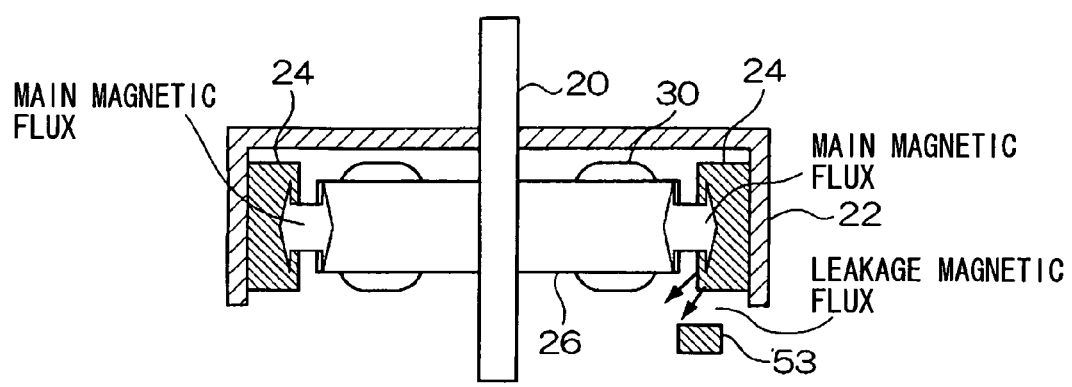
FIG. 16 is a schematic diagram showing an exemplary relationship between a cross section of a motor and a magnetic flux according to a fourth embodiment of the present invention.

FIG. 16 schematically shows an exemplary relationship between the cross section of the motor 16 and the magnetic fluxes. As shown in FIG. 16, even in the case where the rotor magnet 24, which generates the main magnetic flux for generating the rotational force, is magnetized to have the magnetic poles at equal pitches, it is difficult to place each of the Hall sensors 53 in a location, at which the main magnetic flux can be directly sensed with the Hall sensor 53, because of a limited space in the rotor 22. Therefore, as shown in FIG. 16, a leakage magnetic flux is sensed with the Hall sensors 53. The amount of the leakage magnetic flux is smaller than that of the main magnetic flux, so that the output of the Hall sensors 53 may not have the equal pitches in some cases. However, even in such a case, when the correction data value is obtained in a manner similar to that of the third embodiment, the positional deviation of the Hall sensor(s) 53 can be corrected.

In the above embodiments, the motor actuator 12 has the brushless motor 16 and the brushless motor control apparatus 10. In some cases, the motor actuator 12 itself may be constructed as a brushless motor (blower motor) having the brushless motor control apparatus 10 in the housing 14 thereof.

Additional advantages and modifications will readily occur to those skilled in the art. The invention in its broader terms is therefore not limited to the specific details, representative apparatus, and illustrative examples shown and described.

What is claimed is:

1. A brushless motor control apparatus comprising:
   a power supply means for energizing each of a plurality of windings of a plurality of phases in a brushless motor at corresponding predetermined energization timing;
   a rotational position sensing means for sensing a rotational position of a rotor of the brushless motor and for outputting a rotational position measurement signal, which corresponds to the sensed rotational position of the rotor;
   a power supply control means for controlling the energization timing of the power supply means based on the sensed rotational position of the rotor;
   a correction means for obtaining an electrical angle of a period between timing, at which an induced voltage generated in the brushless motor becomes a predetermined value after turning off of the energization of the plurality of windings from the power supply means, and timing, at which an output level of the rotational position measurement signal is changed, and for correcting the sensed rotational position of the rotor, which is sensed by the rotational position sensing means, with reference to the obtained electrical angle; and
   a correction control means for controlling the correction means such that the correction means obtains the electrical angle of the period between the timing, at which the induced voltage becomes the predetermined value, and the timing, at which the output level of the rotational position measurement signal is changed, in a period of one complete rotation of the rotor after elapsing of one electrical cycle from the time of turning off of the energization of the plurality of windings from the power supply means.

2. The brushless motor control apparatus according to claim 1, wherein the correction means corrects the sensed rotational position of the rotor, which is sensed by the rotational position sensing means, based on a difference between the obtained electrical angle and a predetermined standard electrical angle, which is predetermined according to a position of the rotational position sensing means relative to the rotor.

3. The brushless motor control apparatus according to claim 1, wherein:
   the correction means obtains the electrical angle of the period between the timing, at which the induced voltage generated in the brushless motor becomes the predetermined value after the turning off of the energization of the plurality of windings from the power supply means, and the timing, at which the output level of the rotational position measurement signal is changed, for each of a plurality of electrical cycles; and
   the correction means corrects the sensed rotational position of the rotor, which is sensed by the rotational position sensing means, based on a difference between an average value of the electrical angles of the plurality of electrical cycles and a predetermined standard electrical angle, which is predetermined according to a position of the rotational position sensing means relative to the rotor.

4. The brushless motor control apparatus according to claim 1, wherein:
the electrical angle, which is obtained by the correction means is of an initial one of a plurality of electrical cycles;
the correction means uses the timing, at which the output level of the rotational position measurement signal is change in the initial one of the plurality of electrical cycles, as reference timing;
the correction means further obtains an electrical angle of a period between subsequent timing, at which the induced voltage generated in the brushless motor becomes the predetermined value once again, and the reference timing for each of the rest of plurality of electrical cycles;
the correction means obtains an electrical angle difference between the electrical angle of each of the plurality of electrical cycles and a corresponding predetermined electrical angle, which is specific to the electrical cycle, to obtain a plurality of electrical angle differences associated with the plurality of electrical cycles, respectively;
the correction means corrects the sensed rotational position of the rotor, which is sensed by the rotational position sensing means, based on one of:
    a difference between an average value of the plurality of electrical angle differences and a predetermined standard electrical angle, which is predetermined according to a position of the rotational position sensing means relative to the rotor; and
    an average value of differences, each of which is between a corresponding one of the plurality of electrical angle differences and the standard electrical angle.

5. The brushless motor control apparatus according to claim 1, wherein the power supply control means turns off the energization of the plurality of windings from the power supply means in the period of the one complete rotation of the rotor since timing, at which a rotational speed of the rotor reaches a predetermined rotational speed that is set based on a normal rotational speed of the rotor after time of starting rotation of the rotor.

6. A brushless motor comprising the brushless motor control apparatus of claim 1.

7. A control method of a brushless motor, comprising:
energizing each of a plurality of windings of a plurality of phases by a power supply means in the brushless motor at corresponding predetermined energization timing;
sensing a rotational position of a rotor of the brushless motor by a rotational position sensing means;
outputting a rotational position measurement signal, which corresponds to the sensed rotational position of the rotor, from the rotational position sensing means;
controlling the energization timing of the power supply means by a power supply control means based on the sensed rotational position of the rotor;
obtaining an electrical angle of a period between timing, at which an induced voltage generated in the brushless motor becomes a predetermined value after turning off of the energization of the plurality of windings from the power supply means, and timing, at which an output level of the rotational position measurement signal is changed, by a correction means;
correcting the sensed rotational position of the rotor, which is sensed by the rotational position sensing means, by the correction means with reference to the obtained electrical angle; and
controlling the correction means by a correction control means such that the correction means obtains the electrical angle of the period between the timing, at which the induced voltage becomes the predetermined value, and the timing, at which the output level of the rotational position measurement signal is changed, in a period of one rotation of the rotor after elapsing of one electrical cycle from the time of turning off of the energization of the plurality of windings from the power supply means.

8. The control method according to claim 7, wherein the correcting of the sensed rotational position of the rotor includes correcting the sensed rotational position of the rotor based on a difference between the obtained electrical angle and a predetermined standard electrical angle, which is predetermined according to a position of the rotational position sensing means relative to the rotor.

* * * * *